US00RE38241E

(19) United States
(12) Reissued Patent
Toukura

(10) Patent Number: US RE38,241 E
(45) Date of Reissued Patent: Aug. 26, 2003

(54) CONTINUOUSLY VARIABLE TRANSMISSION CONTROL METHOD AND APPARATUS

(75) Inventor: Nobusuke Toukura, Yokosuka (JP)

(73) Assignee: Nissan Motor Co., Ltd., Yokohama (JP)

(21) Appl. No.: 09/531,666

(22) Filed: Mar. 20, 2000

Related U.S. Patent Documents

Reissue of:
(64) Patent No.: 5,730,680
Issued: Mar. 24, 1998
Appl. No.: 08/726,082
Filed: Oct. 4, 1996

(30) Foreign Application Priority Data

Oct. 5, 1995 (JP) ..... 7-258835
Oct. 5, 1995 (JP) ..... 7-258836

(51) Int. Cl.[7] ..... F16H 59/48
(52) U.S. Cl. ..... 477/46; 477/45; 477/904
(58) Field of Search ..... 477/45, 46, 48, 477/120, 143, 904

(56) References Cited

U.S. PATENT DOCUMENTS 4,569,254 A * 2/1986 Itoh et al. ..... 477/46
4,589,071 A * 5/1986 Yamamuro et al. ..... 477/48
4,708,031 A * 11/1987 George ..... 477/45
5,012,696 A * 5/1991 Miyawaki ..... 477/45
5,319,999 A * 6/1994 Morishige et al. ..... 477/46
5,655,995 A * 8/1997 Kondo et al. ..... 477/904
5,665,021 A * 9/1997 Inoue ..... 477/904

FOREIGN PATENT DOCUMENTS

JP 6-81932 * 3/1994

* cited by examiner

*Primary Examiner*—Dirk Wright
(74) *Attorney, Agent, or Firm*—Foley & Lardner

(57) ABSTRACT

A method and apparatus for controlling a continuously variable transmission having an input and output shaft for use with an automotive vehicle. The transmission is operable at a variable speed ratio for transmitting a drive from the input shaft to the output shaft. A target value for the speed of rotation of the input shaft of the transmission is calculated based on the sensed vehicle operating conditions including vehicle acceleration (deceleration). A correction factor per predetermined unit time is calculated based on the vehicle acceleration (deceleration) when the vehicle acceleration (deceleration) exceeds a threshold value with the accelerator pedal being released. The correction factor is used to correct the target input shaft speed value at intervals of the predetermined unit time. The speed ratio is controlled to bring the input shaft speed into coincidence with the corrected target value.

36 Claims, 18 Drawing Sheets

CONTINUOUSLY VARIABLE TRANSMISSION CONTROL METHOD AND APPARATUS

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for controlling a continuously variable transmission for use with an automotive vehicle to change the engine brake force when the vehicle is coasting on a slope having a changing gradient.

Some automotive vehicles employ a continuously variable transmission having an input shaft coupled to the engine and an output shaft coupled to the drive shaft for transmitting a drive from the engine to the drive shaft. Such a continuously variable transmission operates with a speed ratio controlled in a manner to bring the speed of rotation of the input shaft into coincidence with a target value calculated as a function of engine throttle position (or accelerator pedal position) and vehicle speed. It is the current practice to decrease the target input shaft speed value as the throttle position decreases, If the vehicle is coasting on a downhill slope, the operator will release the accelerator pedal. This causes the throttle position to decrease so that the target input shaft speed value is changed (decreased) in a direction to weaken the engine brake. As a result, the operator would feel an excessive degree of vehicle acceleration in spite of the fact that the accelerator pedal is released and increase the frequency at which the operator depresses the brake pedal.

For example, Japanese Patent Kokai No. 6-81932 discloses a continuously variable transmission control apparatus intended to reduce the frequency at which the operator depresses the brake pedal when the vehicle is coasting on a downhill slope by setting a great lower limit for the target input shaft speed value to perform aggressive operate engine brake operations. With such a conventional apparatus, however, the target input shaft speed value changes frequently to provide a sense of incompatibility to the operator with changes in the gradient of the slope.

SUMMARY OF THE INVENTION

It is a main object of the invention to provide an improved continuously variable transmission control method and apparatus which can provide a smooth engine brake force change to meet the operators expectation therefor when the vehicle is coasting on a slope having a changing gradient with the accelerator pedal being released.

There is provided, in accordance with the invention, an apparatus for controlling a continuously variable transmission for use with an automotive vehicle including an accelerator pedal. The transmission has an input and output shaft. The transmission is operable at a variable speed ratio for transmitting a drive from the input shaft to the output shaft. The continuously variable transmission control apparatus comprises means for sensing vehicle operating conditions including vehicle acceleration, means for producing a released accelerator pedal indicative signal when the accelerator pedal is released, means for calculating a target value for the speed of rotation of the input shaft based on the sensed vehicle operating conditions, means for calculating a correction factor per predetermined unit time based on the sensed vehicle acceleration when the sensed vehicle acceleration exceeds a threshold value in the presence of the released accelerator pedal indicative signal, means for adding the correction factor to the target input shaft speed value to correct the target input shaft speed value at intervals of the predetermined unit time, and means for controlling the speed ratio to bring the input shaft speed into coincidence with the corrected target value.

In another aspect of the invention, the continuously variable transmission control apparatus comprises means for sensing vehicle operating conditions including vehicle deceleration, means for producing a released accelerator pedal indicative signal when the accelerator pedal is released, means for calculating a target value for the speed of rotation of the input shaft based on the sensed vehicle operating conditions, means for calculating a correction factor per predetermined unit time based on the sensed vehicle deceleration when the sensed vehicle deceleration exceeds a first threshold value in the presence of the released accelerator pedal indicative signal, means for subtracting the correction factor from the target input shaft speed value to decrease the target input shaft speed value at intervals of the predetermined unit time, and means for controlling the speed ratio to bring the input shaft speed into coincidence with the decreased target value.

In another aspect of the invention, there is provided a method of controlling a continuously variable transmission for use with an automotive vehicle including an internal combustion engine, an accelerator pedal and a drive shaft. The transmission has an input shaft coupled to the engine and an output shaft coupled to the drive shaft. The transmission is operable at a variable speed ratio for transmitting a drive from the engine to the drive shaft. The continuously variable transmission control method comprises the steps of sensing vehicle operating conditions including vehicle acceleration, producing a released accelerator pedal indicative signal when the accelerator pedal is released, calculating a target value for the speed of rotation of the input shaft based on the sensed vehicle operating conditions, calculating a correction factor based on the sensed vehicle acceleration when the sensed vehicle acceleration exceeds a threshold value in the presence of the released accelerator pedal indicative signal, adding the correction factor to the target input shaft speed value to correct the target input shaft speed value, controlling the speed ratio to bring the input shaft speed into coincidence with the corrected target value, and continuously repeating the above sequence of steps at uniform intervals of time to effect changes in the target input shaft speed value in response to changes in the vehicle acceleration.

In still another aspect of the invention, the continuously variable transmission control method comprises the steps of sensing vehicle operating conditions including vehicle deceleration, producing a released accelerator pedal indicative signal when the accelerator pedal is released, calculating a target value for the speed of rotation of the input shaft based on the sensed vehicle operating conditions, calculating a correction factor based on the sensed vehicle deceleration when the sensed vehicle acceleration exceeds a first threshold value in the presence of the released accelerator pedal indicative signal, subtracting the correction factor to the target input shaft speed value to decrease the target input shaft speed value, controlling the speed ratio to bring the input shaft speed into coincidence with the decreased target value, and continuously repeating the above sequence of steps at uniform intervals of time to effect changes in the target input shaft speed value in response to changes in the vehicle deceleration.

BRIEF DESCRIPTION OF THE DRAWINGS

The invention will be described in greater detail by reference to the following description taken in connection with the accompanying drawings, in which.

DETAINED DESCRIPTION OF THE INVENTION

Figure 1:
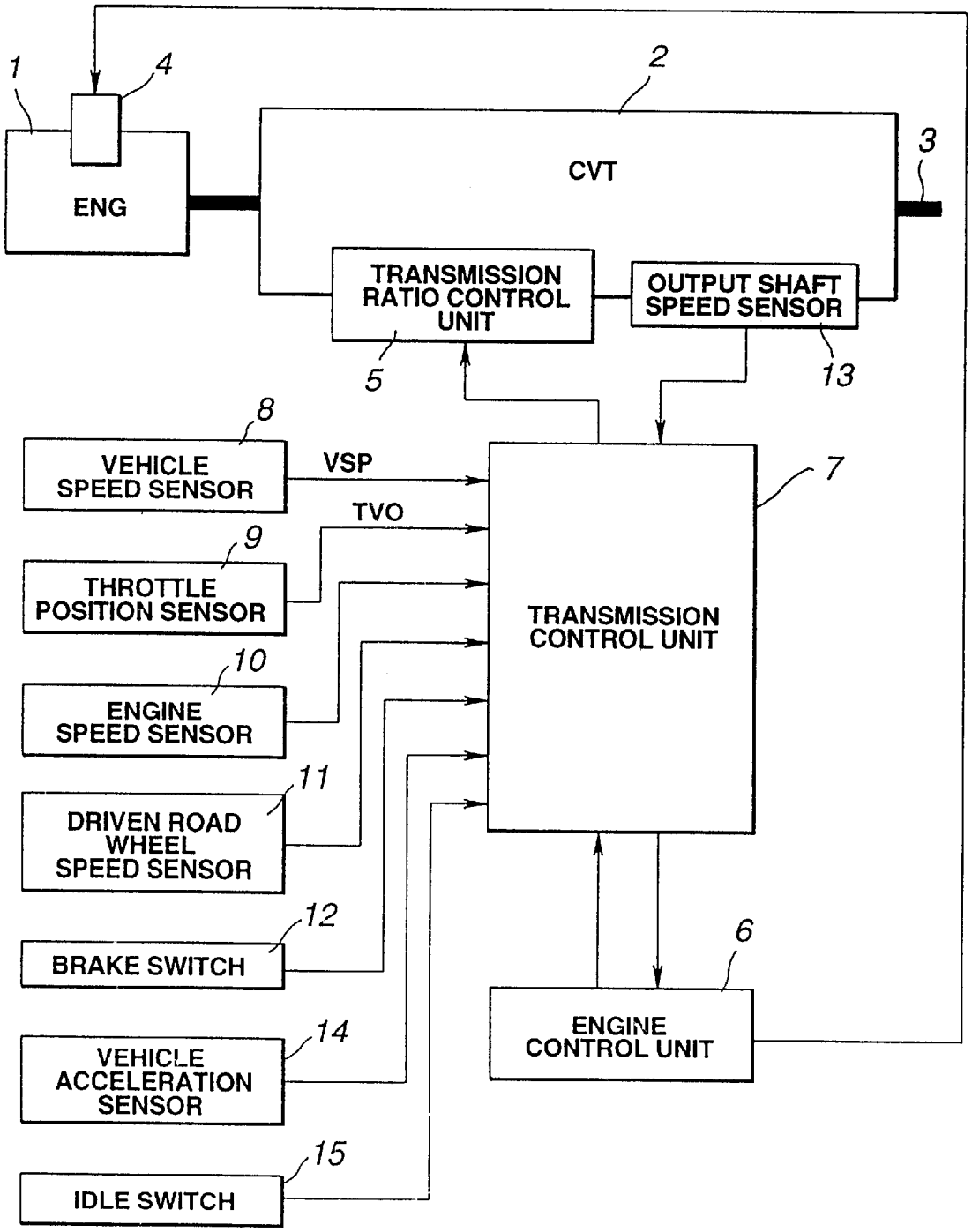
FIG. 1 is a block diagram showing one embodiment of a continuously variable transmission control apparatus made in accordance with the invention.

With reference to the drawings, and in particular to FIG. 1, there is shown a continuously variable transmission control apparatus for use with an automotive vehicle having an internal combustion engine 1. The engine 1 operates on command from an engine control unit 6 which controls the amount of fuel metered to the engine 1, the fuel-injection timing and the ignition-system spark-timing. For example, the amount of fuel metered to the engine, this being determined by the width of the electrical pulses applied to the fuel injector 4, is repetitively determined from calculations performed in the engine control unit 6 based on various conditions of the engine that are sensed during its operation. These sensed conditions include cylinder-head coolant temperature, ambient temperature, throttle position, engine load, engine speed, etc. The calculated value for the fuel-injection pulse-width is transferred to set the fuel injector 4 according to the calculated value therefor. A drive from the engine 1 is transmitted to a drive shaft 3 through a continuously variable transmission 2. The continuously variable transmission 2 has an input shaft coupled to an internal combustion engine 1 and an output shaft coupled to the drive shaft 3. The continuously variable transmission 2 may be of the V-belt or troidal type.

The continuously variable transmission 2 operates on command applied to a speed ratio control unit 5 from a transmission control unit 7. The transmission control unit 7 determines a target input shaft speed DSRREV repetitively from calculations performed therein based on various conditions of the automotive vehicle that are sensed during its operation. These sensed conditions include vehicle speed VSP, throttle position TVO, transmission input shaft speed Ni, driven road wheel speed, brake pedal position, transmission output shaft speed No, vehicle longitudinal acceleration G and accelerator pedal position. Thus, a vehicle speed sensor 8, a throttle position sensor 9, an engine speed sensor 10, a driven road wheel speed sensor 11, a brake switch 12, a transmission output shaft speed sensor 13, a vehicle acceleration sensor 14 and an idle switch 15 are connected to the transmission control unit 7. The vehicle speed sensor is provided to sense the speed VSP of traveling of the automotive vehicle. The throttle position sensor 9 may be a potentiometer associated with the throttle valve situated in the induction passage of the engine and connected in a voltage divider circuit for supplying a voltage proportional to the degree TVO of opening of the throttle valve. The engine speed sensor 10 is provided for producing a pulse signal having a repetition rate proportional to the speed Ne of rotation of the engine. The driven road wheel speed sensor 11 is located for producing a pulse signal having a repetition rate proportional to the speed of rotation of the driven road wheels. The brake switch 12 is responsive to the application of braking to the automotive vehicle to close to supply current from the engine battery to the transmission control unit 7. The transmission output shaft speed sensor 13 is located for producing a pulse signal of a repetition rate proportional to the speed of rotation of the transmission output shaft. The vehicle acceleration sensor 14 is provided for producing a signal indicative of the longitudinal acceleration G of the automotive vehicle. The idle switch 15 closes to supply current from the engine battery to the transmission control unit 7 when the throttle position is at an angle less than a predetermined value, that is, the accelerator pedal is released. The continuously variable transmission is shown as having an input shaft directly coupled to the engine 1. In this case, the speed Ni of rotation of the transmission input shaft is equal to the engine speed Ne. It is to be understood, of course, that the transmission input shaft may be coupled to the engine 1 through a reduction gear unit or torque converter. In this case, another speed sensor is provided to produce a signal indicative of the speed Ni of rotation of the transmission input shaft. The transmission control unit 7 also communicates with the engine control unit 6 for synchronized engine and transmission control. The transmission control unit 7. The determined target input shaft speed DSRREV is converted into a corresponding target speed ratio DSRRTO which is transferred to the speed ratio control unit 5 to bring the input shaft speed Ni into coincidence with the target input shaft speed DSRREV.

The transmission control unit 7 may employ a digital computer which includes a central processing unit (CPU) a central processing unit (CPU), a read only memory (ROM), a random access memory (RAM) and an input/output interface unit (I/O). The central processing unit communicates with the rest of the computer. The input/output interface unit includes an analog-to-digital converter which receives analog signals from the throttle position sensor 9 and other sensors and converts them into digital form for application to the control processing unit. The input/output interface unit also includes counters which count the pulses fed thereto from the speed sensors 10, 11 and 13 and convert the counts into corresponding speed indication digital signals for application to the central processing unit. The read only memory contains the programs for operating the central processing unit and further contains appropriate data in look-up tables used in calculating appropriate values for the speed ratio control.

Figure 2:
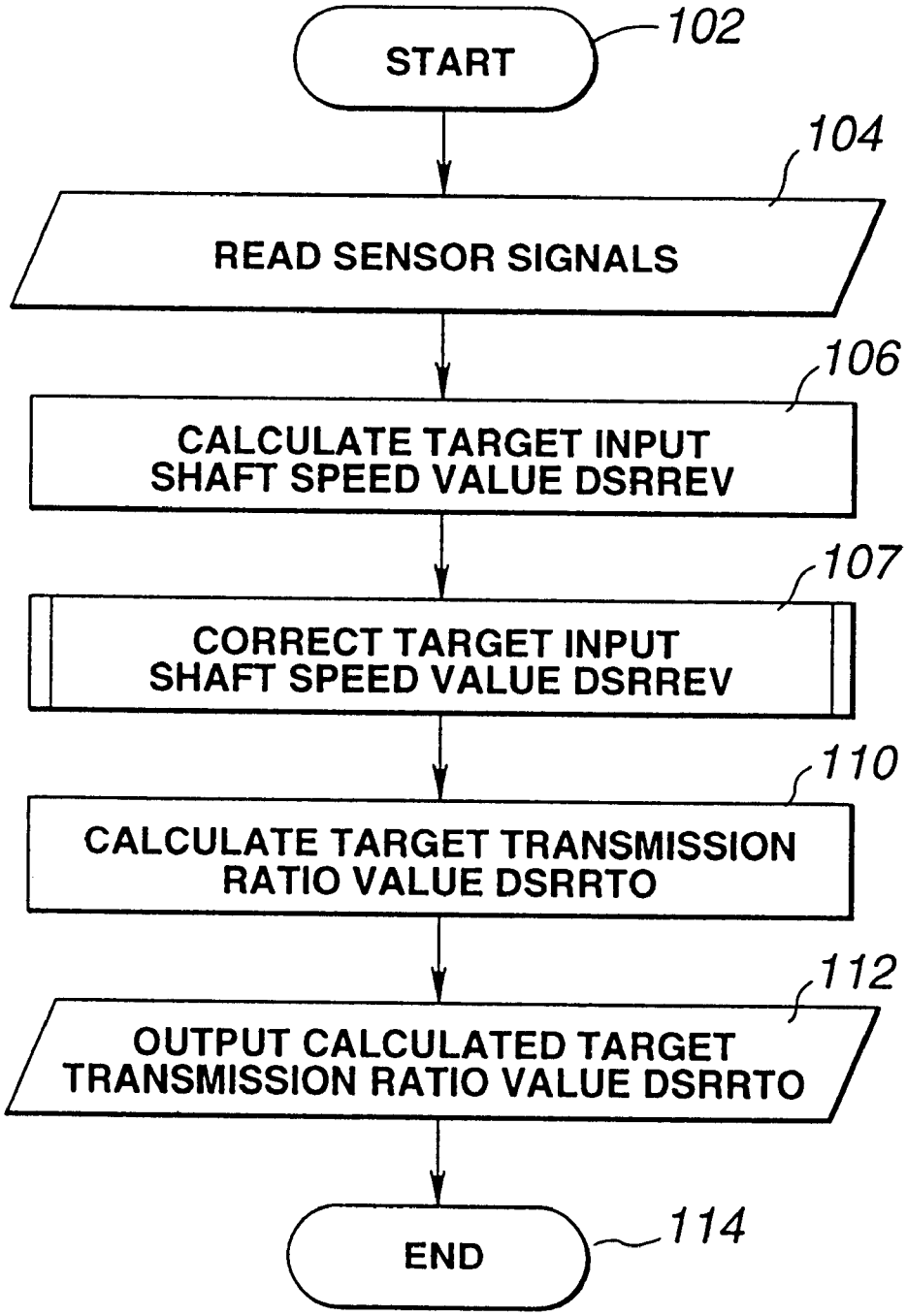
FIG. 2 is an overall flow diagram showing the operation of the digital computer used for the continuously variable transmission control.
Figure 11:
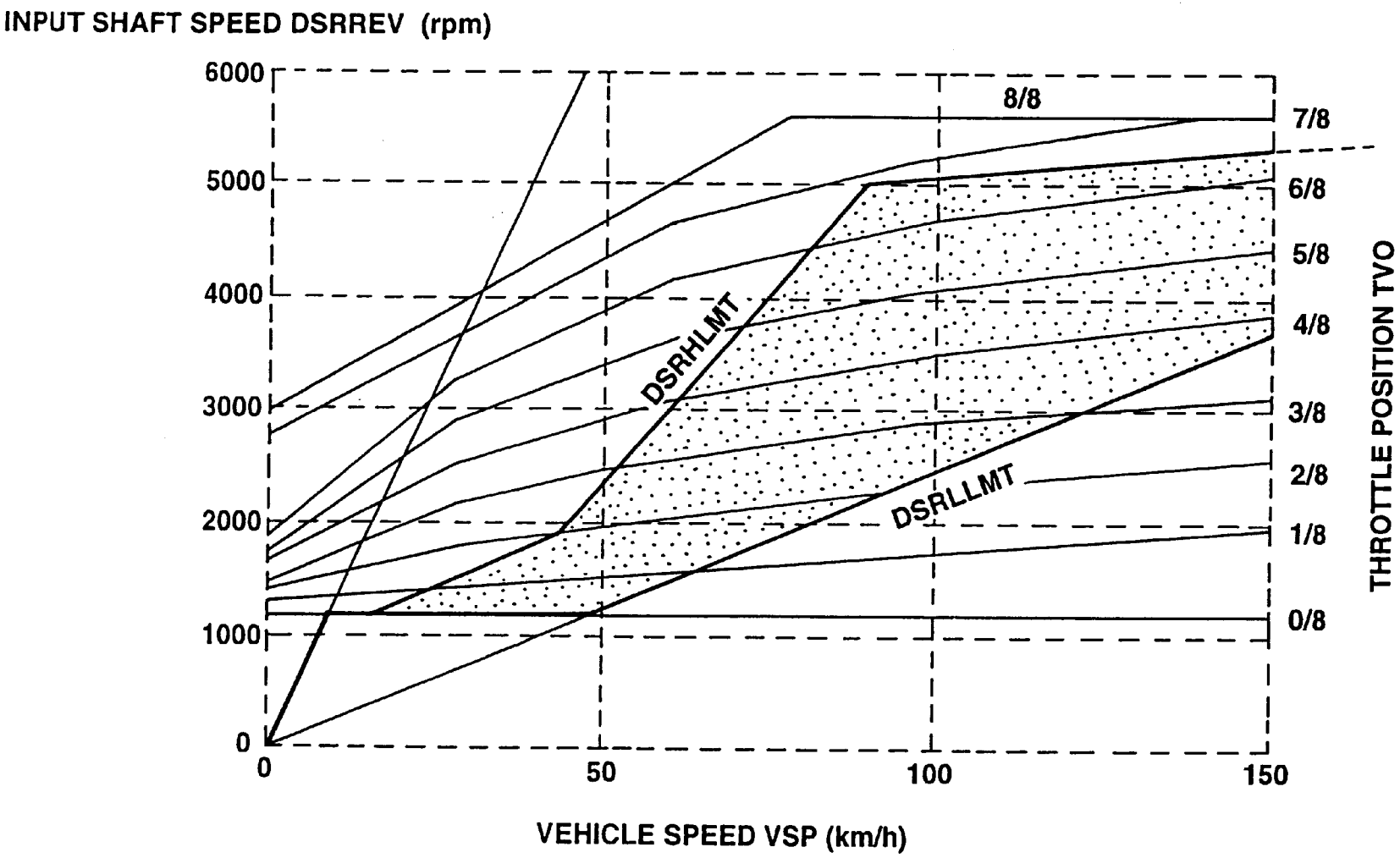
FIG. 11 is a graph of vehicle speed versus input shaft speed.

FIG. 2 is a flow diagram illustrating the programming of the digital computer as it is used to control the continuously variable transmission 2. The computer program is entered at the point 102 at uniform intervals of time, for example 5 msec. At the point 104 in the program, the sensor signals fed to the transmission control unit 7 from various sensors 8 to 15 are read into the computer memory. At the point 106, a target value DSRREV for the speed Ni of rotation of the transmission input shaft is calculated from a speed change map programmed into the computer. The speed change map defines the target input shaft speed DSRREV as a function of throttle position TVO and vehicle speed VSP, as shown in FIG. 11. At the point 108, the calculated target input shaft speed value DSRREV is corrected for engine brake operation. This correction is made based on the vehicle longitudinal acceleration G as described later in greater detail. At the point 110 in the program, a target speed ratio DSRRTO is calculated to bring the transmission input shaft speed Ni in coincidence with the corrected target value DSRREV. At the point 112, the calculated target speed ratio value DSRRTO is transferred to the input/output interface unit which converts it into a corresponding control signal. This control signal is applied to the speed ratio control unit 5 which thereby operates the transmission 2 with a speed ratio corresponding to the calculated value DSRRTO.

Figure 3:
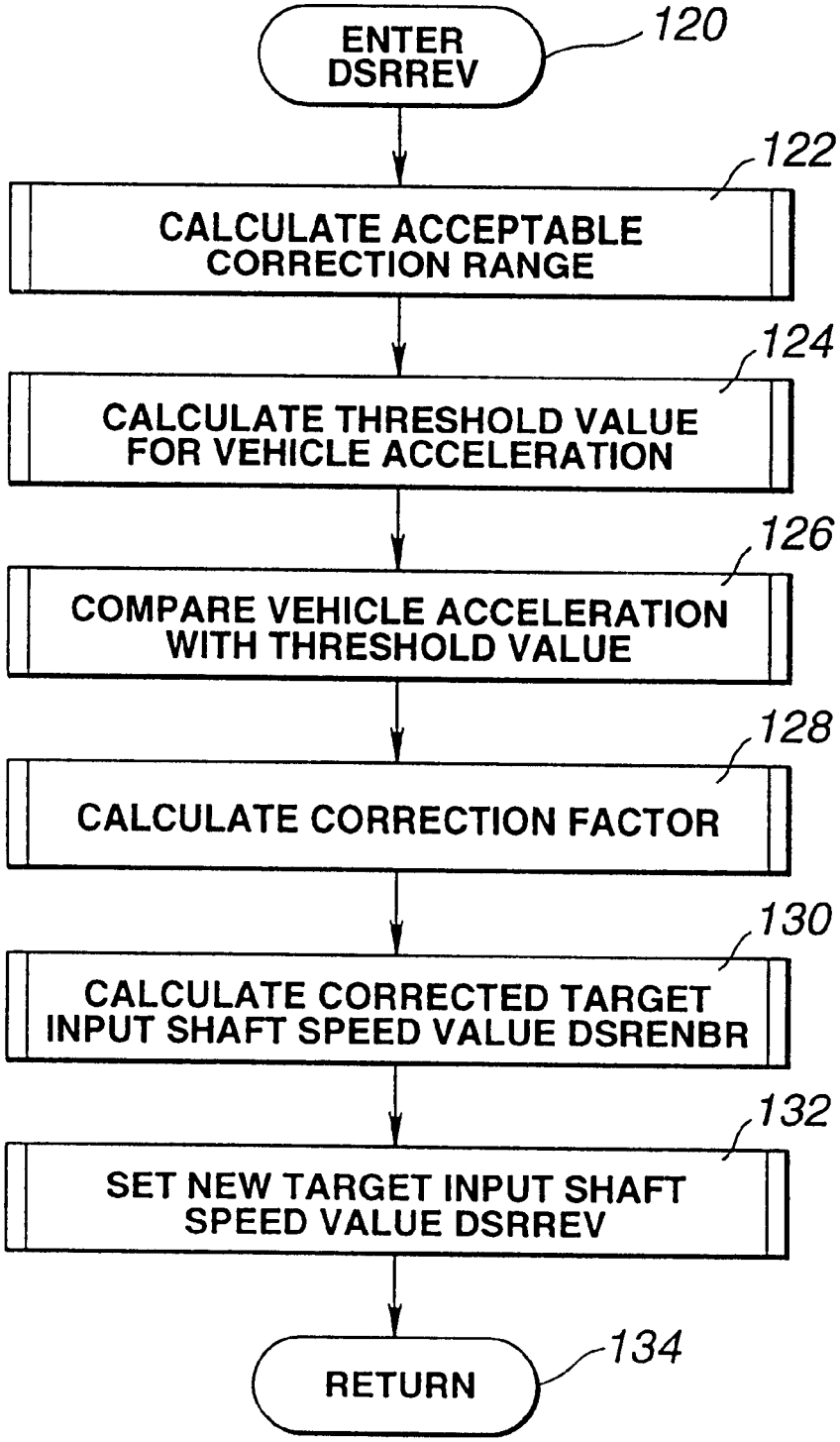
FIG. 3 is a detailed flow diagram showing the programming of the digital computer as it is used for target input shaft speed calculation.

FIG. 3 is a flow diagram illustrating the above correction of the target transmission input shaft speed value DSRREV. At the point 120 in FIG. 3, which corresponds to the point 108 of FIG. 2, the computer program is entered. At the point 122, an acceptable correction range where the speed Ni of the input shaft of the continuously variable transmission 2 can be corrected is determined based on the target input shaft speed DSRREV calculated at the point 106 of FIG. 2. At the point 124, a threshold value of the vehicle longitudinal acceleration G is calculated. At the point 126, the vehicle acceleration G is compared with the calculated threshold value for a determination as to whether or not a stronger or weaker engine brake is required. At the point 128, the rate of change of the engine brake force, that is, a correction factor by which the target input shaft speed is to be corrected per unit time, is calculated according to the vehicle longitudinal acceleration G. At the point 130, the correction factor calculated at the point 128 is used to correct the target input shaft speed DSRREV so as to produce an engine brake force corresponding to the vehicle longitudinal acceleration. At the point 132, the corrected target input shaft speed DSRENBR is set as a new target input shaft speed DSRREV. The new target input shaft speed DSRREV is outputted to calculate a target speed ratio DSRRTO. Following this, the program proceeds to the point 134 where the program returns to the entry point 120.

Figure 12:
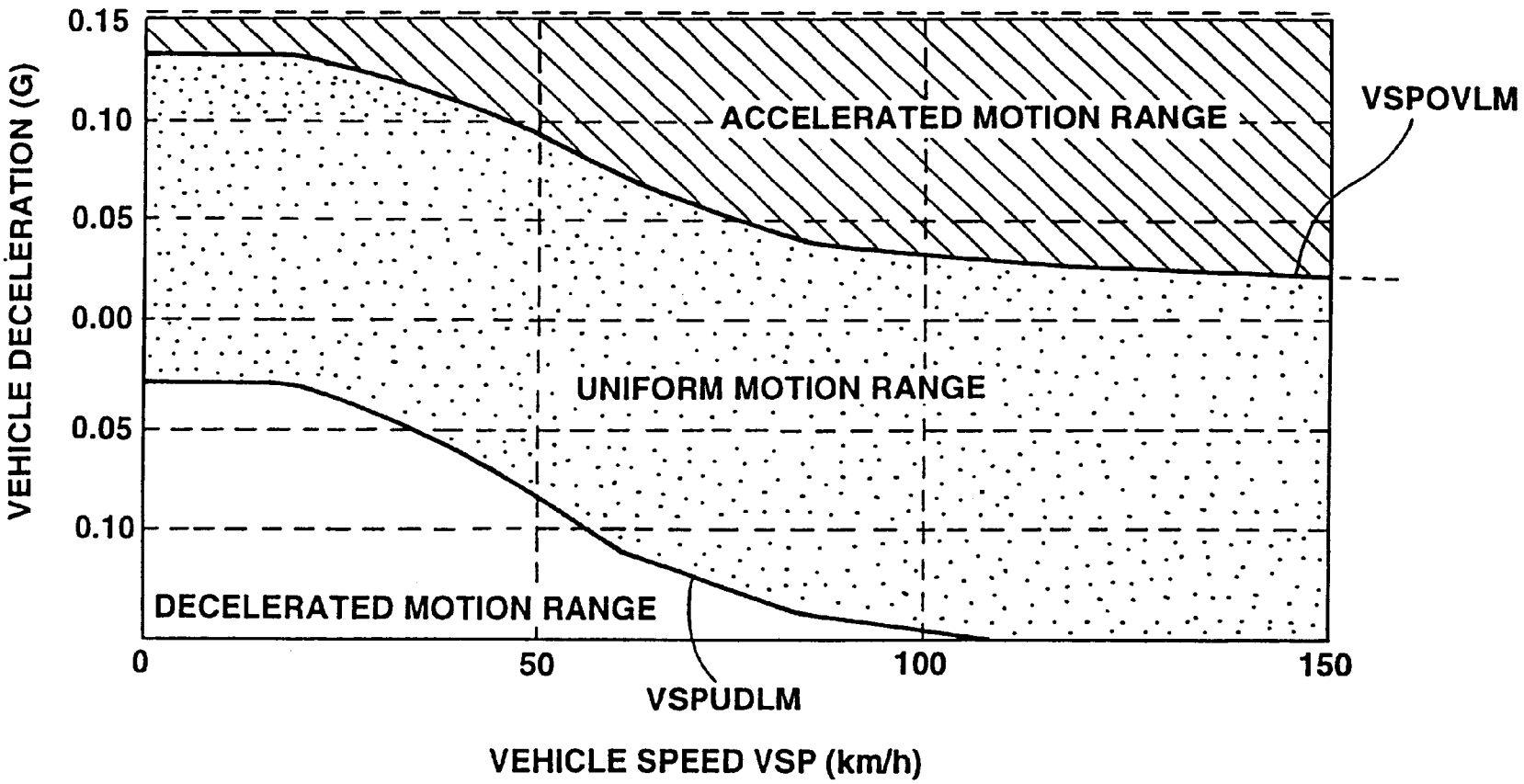
FIG. 12 is a graph of vehicle speed versus vehicle acceleration.

Referring to FIGS. 4 to 10; the details of the above correction of the target transmission input shaft speed value DSRREV will be described. At the point 140 in FIG. 4, which corresponds to the point 122 of FIG. 3, the computer program is entered. At the point 142 in the program, an upper limit DSRHLMT of the acceptable correction range for the input shaft speed Ni is calculated from the map of FIG. 11 which defines the upper limit DSRHLMT as a function of vehicle speed VSP. At the point 144, a lower limit DSRLLMT of the acceptable correction range for the input shaft speed Ni is calculated from the map of FIG. 11 which defines the lower limit DSRLLMT as a function of vehicle speed VSP. At the point 146, an acceleration side threshold value VSPOVLM is calculated from a map programmed into the computer. This map defines the acceleration side threshold value VSPOVIM as a function of vehicle speed VSP, as shown in FIG. 12. At the point 148, a deceleration side threshold value VSPUDLM is calculated from the map of FIG. 12. The map may be obtained experimentally from accelerations the operator expects when the accelerator pedal is released, this being detected when the idle switch 15 is turned on. The operator bodily senses vehicle acceleration in an accelerated motion range (AMR) defined above the acceleration side threshold value VSPOVLM and vehicle deceleration in a decelerated motion range (DMR) defined below the deceleration side threshold value VSPUDLM. Upon completion of the step at the point 148 in the program of FIG. 4, the program proceeds to the point 150 of FIG. 5 which corresponds to the point 126 of FIG. 3. At the point 152, a determination is made as to whether or not the vehicle speed VSP is equal to or less than a predetermined value, for example, 10 Km/h. If the answer to this question is "yes" then it means that the vehicle speed is in a predetermined low speed rnage and the program proceeds to the point 154 where the vehicle acceleration TKRAMS6 is set at 0 and then to the point 166. Otherwise, the program proceeds to the point 156 where the vehicle acceleration (or deceleration) TKRAMS6 is calculated based on the difference between the vehicle speed VSP read in this cycle of execution of this program and the vehicle speed $VSP_{-5}$ read before a predetermined number of (in this case 5) cycles of execution of this program. Although the vehicle acceleration TKRAMS6 is calculated as the rate of change of the vehicle speed VSP, it is to be understood, of course, that it may be the sensed value of the vehicle acceleration sensor 14. At the point 158, a determination is made as to whether or not the vehicle acceleration TKRAMS6 is greater than the acceleration side threshold value VSPOVLM calculated at the point 146 of FIG. 4. If the answer to this question is "yes", then the program proceeds to the point 160 where an accelerated motion flag VSPPLS is set to indicate that the vehicle acceleration is in the accelerated motion range so that a stronger engine brake is required and then to the point 168. Otherwise, the program proceeds to another determination step at the point 162. This determination is as to whether or not the vehicle acceleration TKRAMS6 is smaller than the deceleration side threshold value VSPUDLM calculated at the point 148 of FIG. 4. If the answer to this question is "yes", then the program proceeds to the point 164 where a decelerated motion flag VSPMNS is set to indicate that the vehicle acceleration is in the decelerated motion range requiring a weaker engine brake force and then to the point 168. Otherwise, the program proceeds to the point 166 where a uniform motion flag VSPEOS is set to indicate that the vehicle acceleration is in the uniform motion range so that the existing engine brake is to be retained.

Figure 6:
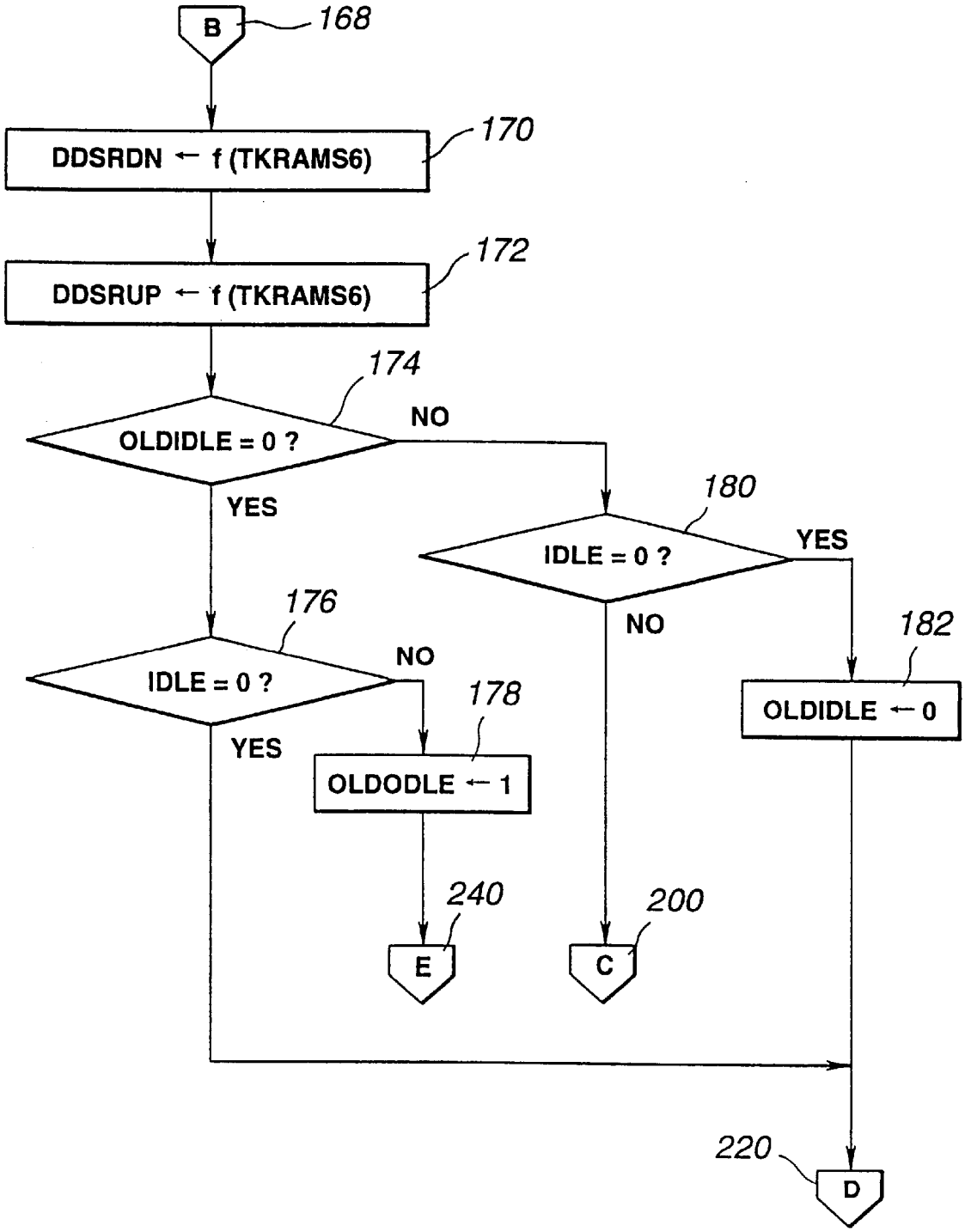
Figure 13:
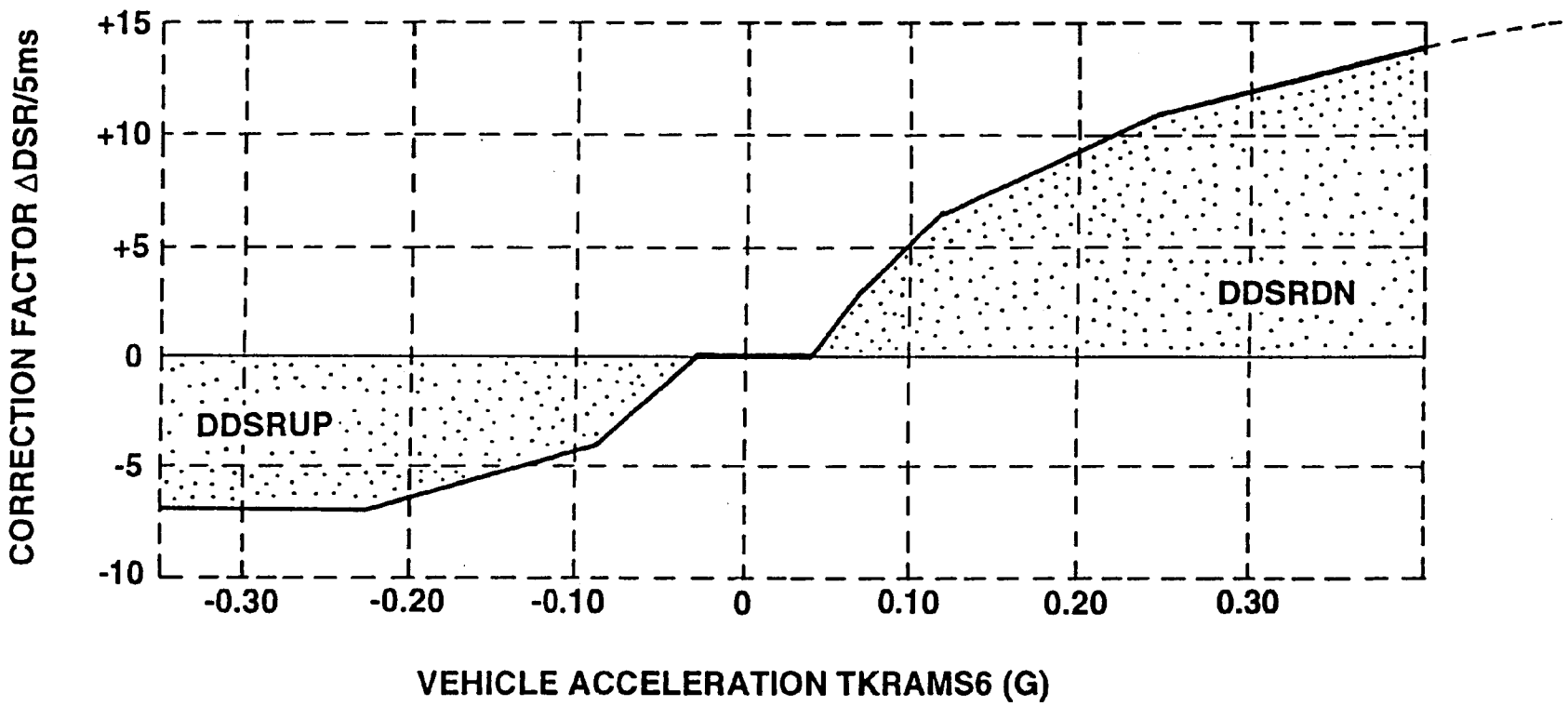
FIG. 13 is a graph of vehicle acceleration versus input shaft speed correction factor.

Following this, the program proceeds to the point 168 of FIG. 6 which corresponds to the point 128 of FIG. 3. At the points 170 and 172 in the program, a down- or up-shift correction factor DDSRDN or DDSRUP by which the target input shaft speed DSRREV is to be corrected per unit time is calculated from a map programmed into the computer. This map specifies this correction factor DDSRDN or DDSRUP as a function of vehicle acceleration TKRAMS6, as shown in FIG. 13, This map may be obtained experimentally, as described later. The downshift correction factor DDSRDN is calculated in a direction to increase the target input shaft speed value DSRREV so as to increase the engine brake force when the vehicle acceleration TKRAMS6 has a positive sign and the up-shift correction factor DDSRUP is calculated in a direction to decrease the target input shaft speed value DSRREV so as to decrease the engine brake force when the vehicle acceleration TKRAMS6 has a negative sign. In the illustrated case, the unit time corresponds to the time interval (5 msec) of execution of this program.

At the point 174 in the program, a determination is made as to whether or not a flag OLDIDLR, which was set to 1 if the idle switch 15 is off in the last cycle of execution of this program, is 0. If the answer to this question is "yes" then the accelerator pedal was depressed and the program proceeds to another determination step at the point 176. This determination is as to whether or not a flag IDLE, which has been set to 1 if the idle switch 15 is off in the present cycle of execution of this program, is 0. If the answer to this question is "yes" then it means that the accelerator pedal remains depressed and the program proceeds to the point 220 of FIG. 8. Otherwise, it means that the accelerator pedal is released from its depressed position and the program proceeds to the point 178 where the flag OLDIDLE is set to 1 and then the program proceeds to the point 240 of FIG. 9.

If the answer to the question inputted at the point 174 is "no" then it means that the accelerator pedal was released and the program proceeds to another determination step at the point 180. This determination is as to whether or not the flag IDLE is 0. If the answer to this question is "no", then it means that the accelerator pedal remains released and the program proceeds to the point 200 of FIG. 7. Otherwise, it means that the accelerator pedal is depressed from its released position and the program proceeds to the point 182 where the flag OLDIDLE is cleared to 0 and then to the point 220 of FIG. 8.

Figure 7:
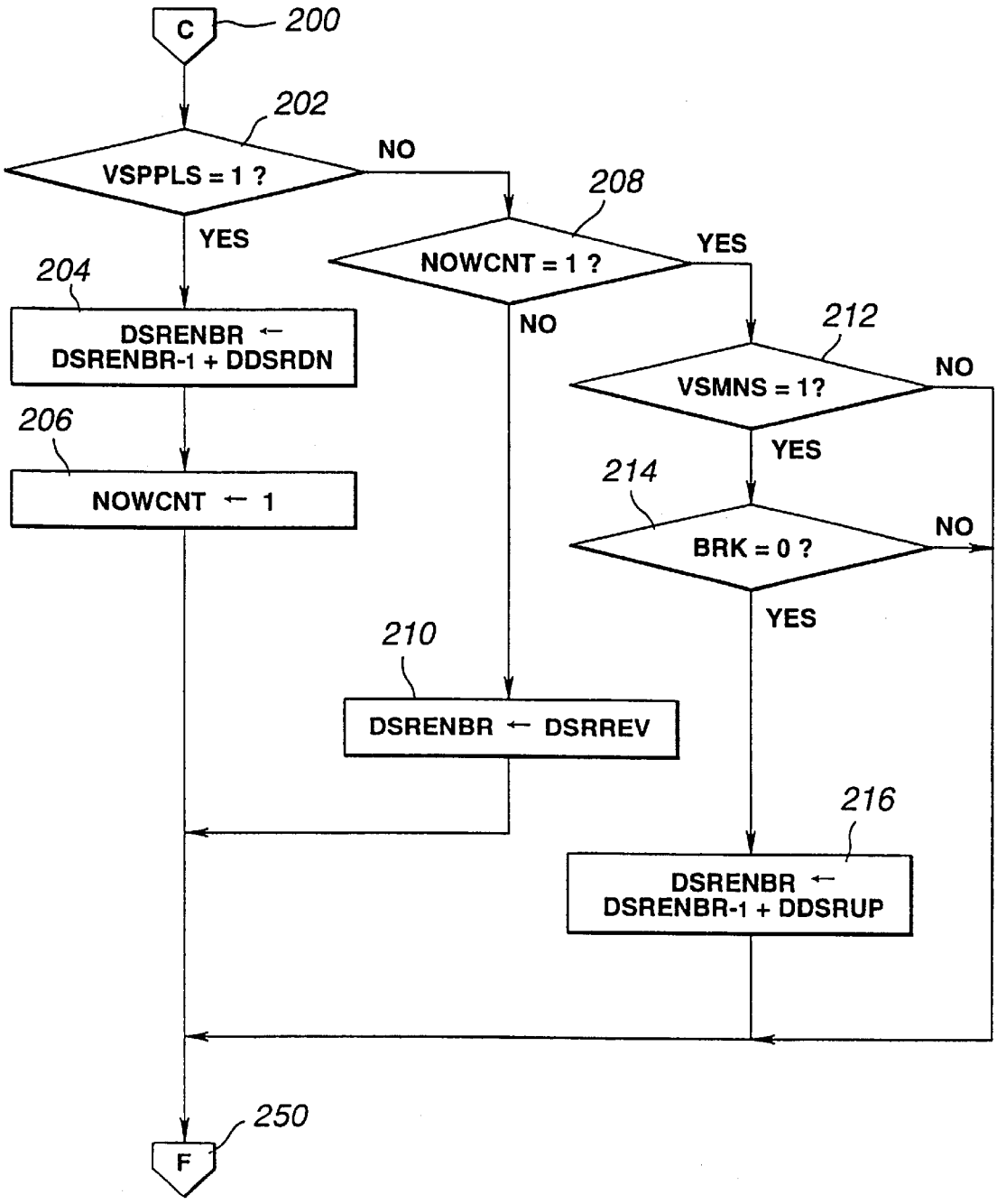

FIG. 7 is a flow diagram illustrating the correction of the target input shaft speed value DSRREV when the accelerator pedal remains released. At the point 202 in the program, a determination is made as to whether or not the accelerated motion flag VSPPLS (FIG. 5) has been set at 1. If the answer to this question is "yes" then it means that the vehicle acceleration is in the accelerated motion range (FIG. 12) and the program proceeds to the point 204 where the central processing unit increase the target input shaft speed value DSRREV by adding the downshift correction factor DDSRDN calculated at the point 170 of FIG. 6 to the last corrected target input shaft speed value DSRENBR (DSRENBR=DSRENBR$_{-1}$+DDSRDN where DSRENBR$_{-1}$ is the corrected target input shaft speed value obtained in the last cycle of execution of this program) in order to increase the engine brake force so as to bring the vehicle acceleration from the accelerated motion range into the uniform motion range. At the point 206, a correction flag NOWCNT is set at 1 to indicate that the target input shaft speed value DSRREV is being corrected. Following this, the program proceed to the point 250 of FIG. 10.

If the answer to the question inputted at the point 202 is "no", then the program proceeds to another determination step at the point 208. This determination is as to whether or not the correction flag NOWCNT has been set. If the answer to this question is "no", then it means that no correction is required for the target input shaft speed value DSRREV and the program proceeds to the point 210 where the target input shaft speed value DSRREV calculated at the point 106 of FIG. 2 is set for the corrected target input shaft speed value DSRENBR. Following this, the program proceeds to the point 250 of FIG. 101

If the answer to the question inputted at the point 208 is "no", then the program proceeds to another determination step at the point 212. This determination is as to whether or not the decelerated motion flag VSPMNS (FIG. 5) has been set. If the answer to this question is "yes", then it means that the vehicle acceleration is in the decelerated motion range and the program proceeds to the point 214. Otherwise, the program proceeds to the point 250 of FIG. 10. At the point 214, a determination is made as to whether or not the brake pedal is released. This determination is made based on the signal BRK fed from the brake switch 12. If the answer to this question is "yes" (BRK=0), than the program proceeds to the point 216 where the central processing unit decreases the target input shaft speed value DSRREV gradually by adding the up-shift correction factor DDSRUP (negative value) calculated at the point 172 of FIG. 6 to the last corrected target input shaft speed value DSRENBR (DSRENBR=DSRENBR$_{-1}$+DDSRUP where DSRENBR$_{-1}$ is the corrected target input shaft speed value DSRENBR obtained in the last cycle of execution of this program). Following this, the program proceeds to the point 250 of FIG. 10. If the answer to the question inputted at the point 214 is "no", then the program proceeds to the point 250 of FIG. 10. That is, the operators braking operation is given top priority by preventing the target input shaft speed value DSRREV from being corrected to a smaller value even though the vehicle acceleration is in the decelerated motion range where the engine brake should be weakened.

Figure 8:
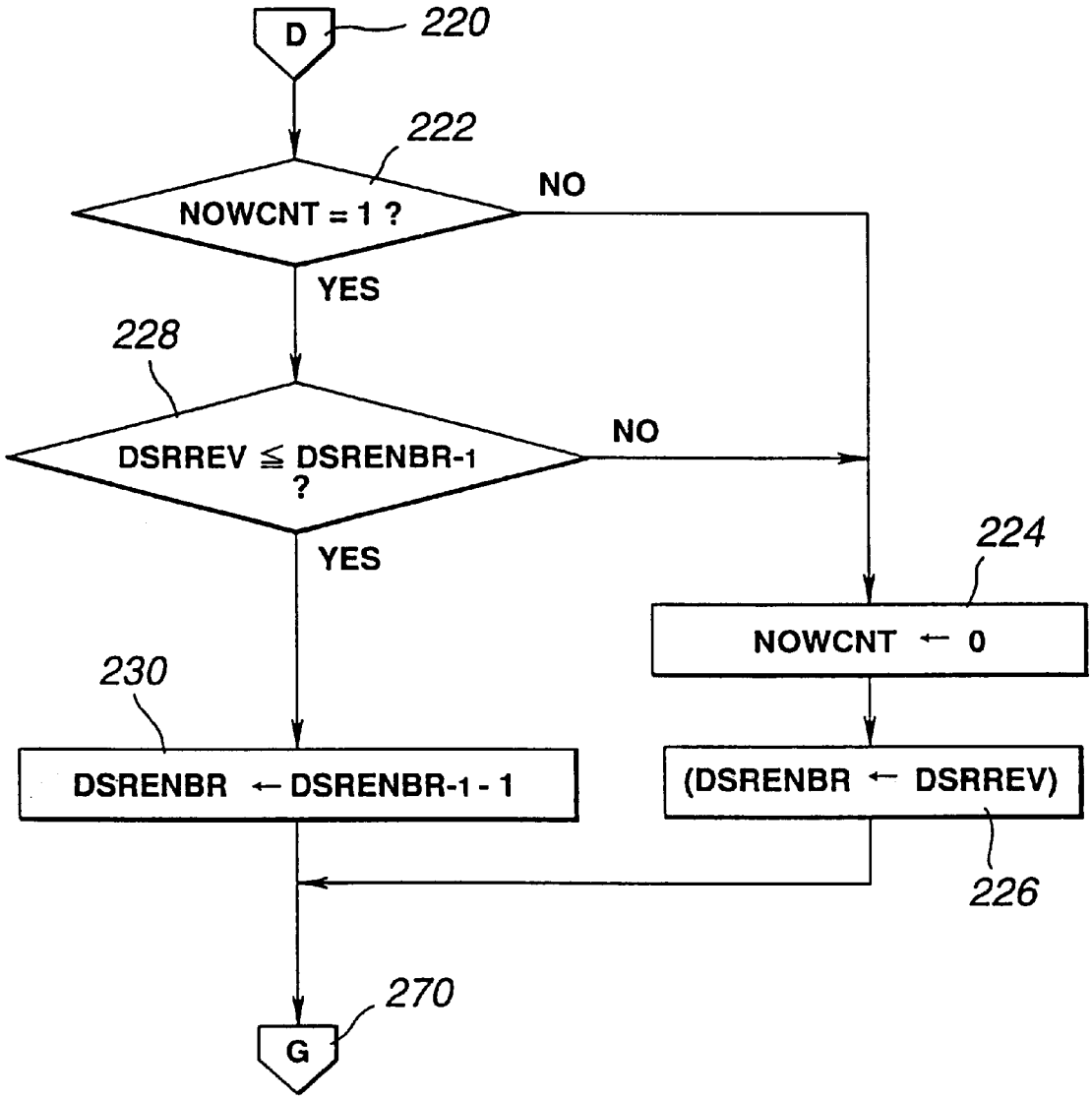

FIG. 8 is a flow diagram illustrating the correction of the target input shaft speed value DSRREV when the accelerator pedal is depressed or remains depressed. At the point 222 in the program, a determination is made as to whether or not the correction flag NOWCNT has been set at 1. If the answer to this question is "yes", then it means that the target input shaft speed value DSRREV is being corrected and the program proceeds to the point 228. Otherwise, the program proceeds to the point 224 where the correction flag NOWCNT is cleared to 0 and then to the point 226 where the target input shaft speed value DSRREV calculated at the point 106 of FIG. 2 is set for the corrected target input shaft speed value DSRENBR. Following this, the program proceeds to the point 270 of FIG. 10.

At the point 228 in the program, a determination is made as to whether or not the target input shaft speed value DSRREV calculated at the point 106 of FIG. 2 is equal to or less than the corrected target input shaft speed value DSRENBR$_{-1}$ obtained in the last cycle of execution of this program. If the answer to this question is "yes", then the program proceeds to the point 230. Otherwise, the program proceeds to the point 224. At the point 230, the corrected target input shaft speed value DSRENBR is calculated by subtracting a predetermined value (in the illustrated case 1 rmp) from the last corrected target input shaft speed value DSRENBR$_{-1}$ (DSRENBR=DSRENBR$_{-1}$ −1). Following this, the program proceeds to the point 270 of FIG. 10.

Figure 9:
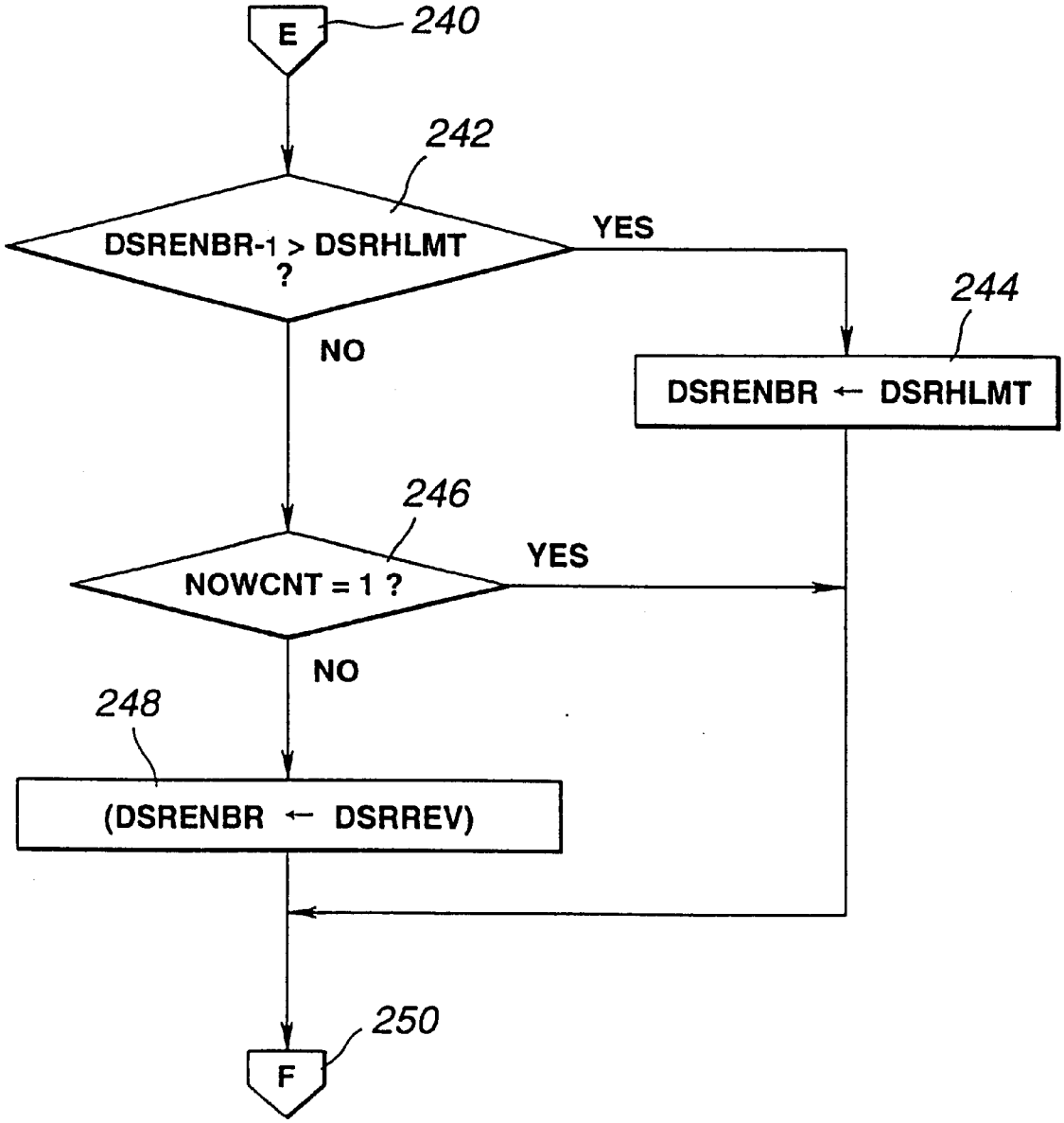

FIG. 9 is a flow diagram illustrating the correction of the target input shaft speed value DSRREV when the accelerator pedal is released. At the point 242 in the program, a determination is made as to whether or not the last corrected target input shaft speed value DSRENBR$_{-1}$ is greater than the upper limit DSRHLMT for the input shaft speed calculated at the point 142 of FIG. 4. If the answer to this question is "yes", then the program proceeds to the point 244 where the upper limit. DSRHLMT is set for the corrected target input shaft speed DSRENBR and then to the point 250 of FIG. 10. Otherwise, the program proceeds to another determination step at the point 246. This determination is as to whether or not the correction flag NOWCNT has been set at 1. If the answer to this question is "yes", then it means that the target input shaft speed value DSRREV is being corrected and the program proceeds to the point 250 of FIG. 10. Otherwise, the program proceeds to the point 228 where the target input shaft speed value DSRREV calculated at the point 106 of FIG. 2 is set for the corrected target input shaft speed value DSRENBR. Following this, the program proceeds to the point 250 of FIG. 10.

Figure 4:
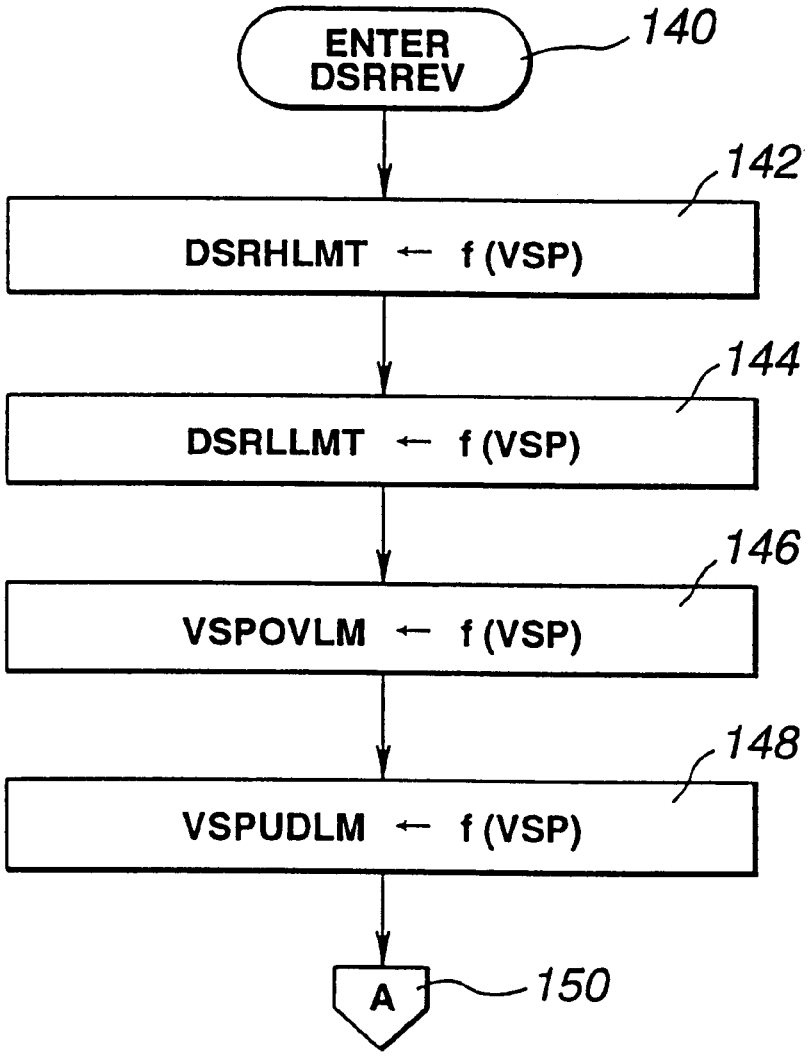
FIGS. 4 to 10 are detailed flow diagrams showing the programming of the digital computer as it is used for target input shaft speed calculation.
Figure 5:
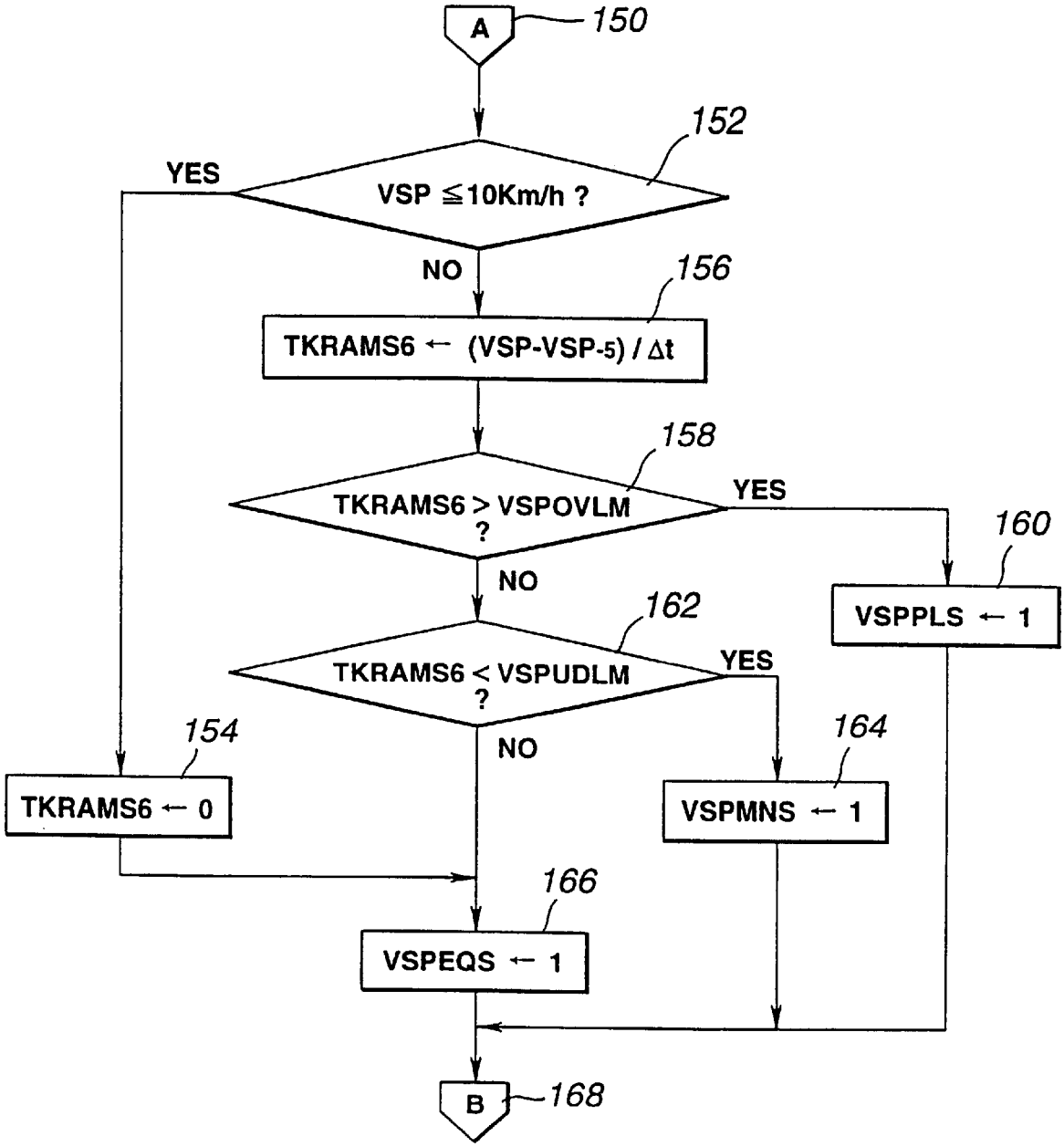
Figure 10:
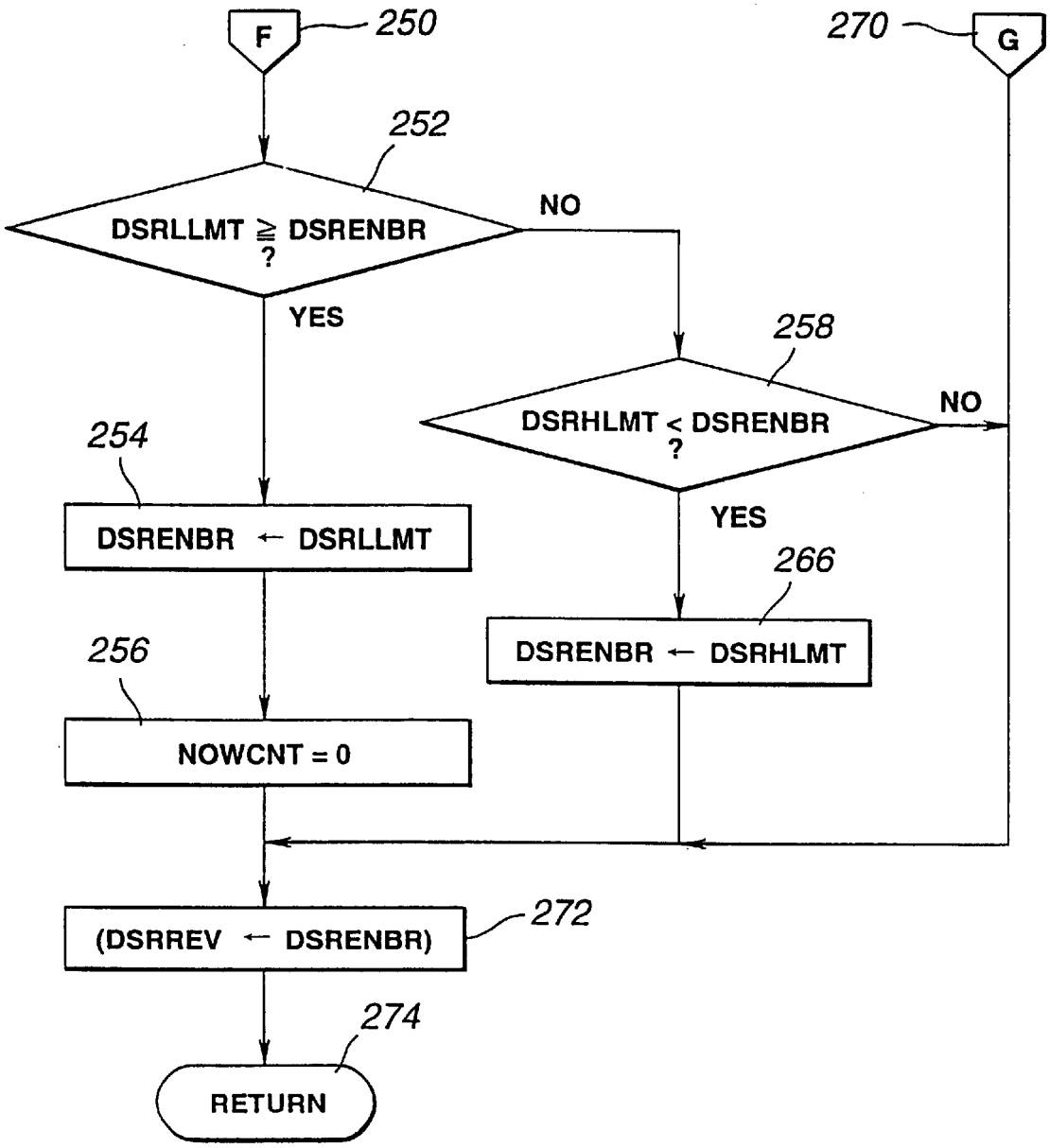

At the point 252 in the program of FIG. 10, a determination is made as to whether or not the corrected target input shaft speed value DSRENB is equal to or less than the lower limit DSRLLIT calculated at the point 144 of FIG. 4. If the answer to this question is "yes", then the program proceeds to the point 254 where the lower limit DSRLLMT is set for the corrected target input shaft speed value DSRENBR. At the point 256, the correction flag is cleared to zero. Following this, the program proceeds to the point 272.

If the answer to the question inputted at the point 254 is "no", then the program proceeds to another determination step at the point 258. This determination is as to whether or not the corrected target input shaft speed value DSRENBR is greater than the upper limit DSRHLMT calculated at the point 142 of FIG. 4. If the answer to this question is "yes", then the program proceeds to the point 266. Otherwise, the program proceeds to the point 272. At the point 266, the upper limit DSRHLMT is set for the corrected target input shaft speed value DSRENBR. Upon completion of the step at the point 266, the program proceeds to the point 272. The program proceeds from the point 270 to the point 272.

At the point 272, the corrected target input shaft speed value DSRENBR is set for the new target input shaft speed value DSRREV. Following this, the program proceeds to the point 274 where the program returns to the entry point 102 of FIG. 2. The calculated new target input shaft speed value DSRREV is transferred to the input/output interface unit which converts it into a corresponding target speed ratio and produces a control signal causing the speed ratio control unit 5 to set the continuously variable transmission 2 according to the target speed ratio.

Test were performed on a given automotive vehicle coasting down hills with the accelerator pedal released to determine the optimum desired relationships between downshift correction factors DDSRDN and vehicle accelerations. The test results indicate that the degree of deceleration the operator expects changes according to the vehicle acceleration. The map of FIG. 13 from which the down- and up-shift correction factors DDSRDN and DDSRUP are calculated is prepared in view of the test results.

Figure 14:
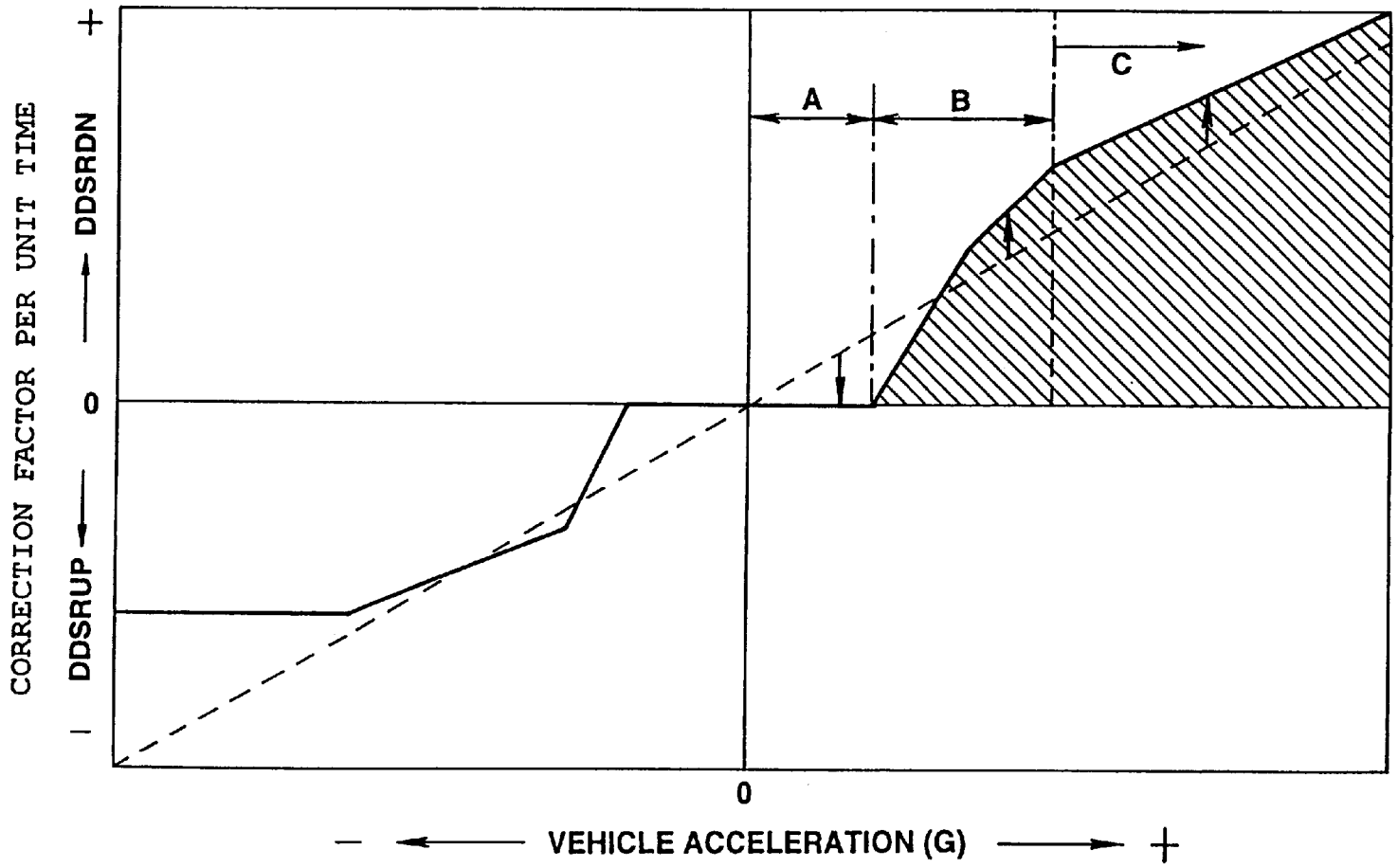
FIG. 14 is a graph of vehicle acceleration versus input shaft speed correction factor.

The calculation of the downshift correction factor DDSRDN will be described further with reference to FIG. 14. The bold lines indicate changes in the down-shaft correction factor DDSRDN in connection with values set in direct proportion to the vehicle acceleration, as indicated by the broken line. FIG. 14 shows the acceleration region where the vehicle acceleration is positive as divided into a small acceleration range A where the vehicle acceleration is less than a predetermined value near zero, an intermediate acceleration range B and a great acceleration range C. The small acceleration range A is characterized by the fact that the operator is bothered with frequent engine speed (target input shaft speed) changes, the operator feels a sense of incompatibility with the downshift correction factor DDSRON set in direct proportion to the vehicle acceleration, indicated by the broken line of FIG. 14, and the operator does not expect vehicle deceleration even when the accelerator pedal is released. Thus, it is desirable in the small acceleration range A to set the downshift correction factor DDSRDN almost at zero. The intermediate acceleration range B is characterized by the fact that the operator requires a rapid engine brake increase and is impatient with a delay of engine brake application because of gradually increasing engine speeds. Thus, it is desirable in the intermediate acceleration range B to realize rapid engine brake application by increasing the downshift correction factor DDSRDN, as indicated by the bold lines of FIG. 14. The great acceleration range C is characterized by the fact that the operator requires a great engine brake force because of rapid vehicle speed increases. The operator does not feel any sense of incompatibility even for an excessive degree of deceleration and feels uneasy for an insufficient degree of deceleration. Thus, it is desirable in the great acceleration range C to set the downshift correction factor DDSRDN much greater than the values set in direct proportion to the vehicle acceleration.

Figure 15:
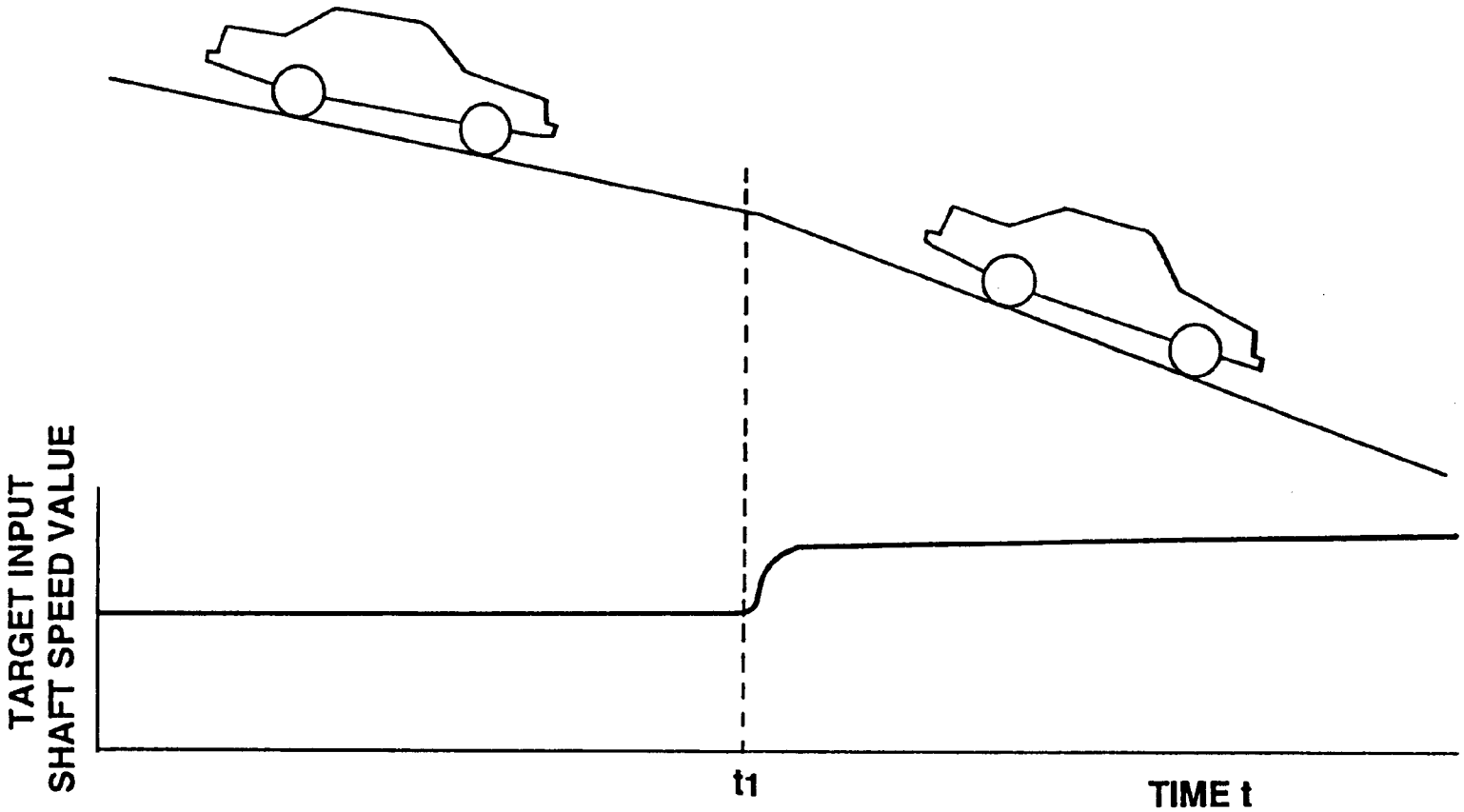
FIG. 15 is a graph used in explaining the operation of the speed change control apparatus of the invention when the vehicle is coasting on a downhill slope having a changing gradient.
Figure 16:
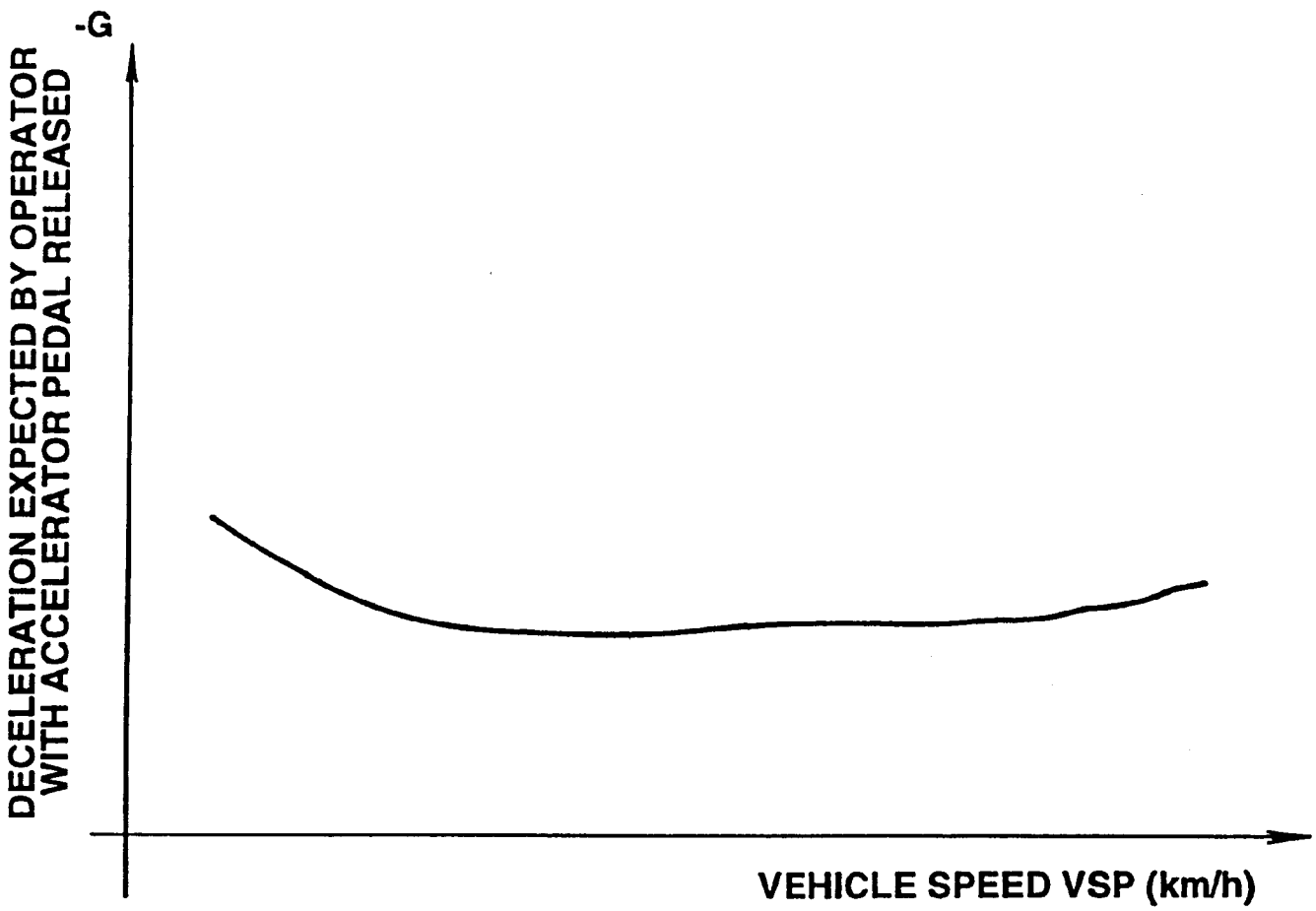
FIG. 16 is a graph of vehicle speed versus operators expected deceleration.

The operation of the speed change control apparatus of the invention will be described in connection with a downhill slope having its gradient changed, as shown in FIG. 15, to cause a vehicle acceleration change when the vehicle is coasting with the accelerator pedal held released. In this case, a stronger engine brake is required to deal with a great vehicle acceleration change at time t1. The invention meets this requirement by setting the acceleration flag VSPPLS at the point 160 of FIG. 5 when the vehicle acceleration increases into the accelerated motion range (FIG. 12), calculating the down-shaft correction factor DDSRDN from the map, as shown in FIG. 13, at the point 170 of FIG. 6, and adding the correction factor DDSRDN to the corrected target input speed value DSRENBR at the point 204 of FIG. 7 since the accelerator pedal remains released. As a result, the target input shaft speed DSRREV increases by the correction factor DDSRDN at uniform intervals of time (5 msec). If the vehicle acceleration is in the intermediate or great acceleration range B or C (FIG. 14), the rate of increase of the engine braking force will increase according to the degree of vehicle acceleration.

Since the target input shaft speed DSRREV changes continuously at uniform time intervals by a down-shaft correction factor DDSRDN set to increase at a greater vehicle acceleration, as shown in FIGS. 13 and 14, when the vehicle acceleration exceeds a predetermined threshold value, the engine brake force can change, in such a smooth manner as to meet the operator's expectation, according to the vehicle acceleration change, as shown in FIG. 15, with no sudden change even upon the occurrence of a rapid and great vehicle acceleration change. It is, therefore, possible to permit the vehicle to coast smoothly on a downhill slope having a changing gradient with the accelerator pedal being released.

It is to be understood that the deceleration made with the use of the down-shaft correction factor DDSRDN is not intended to reduce the vehicle acceleration to zero and to shift the vehicle acceleration from the accelerated motion range to the uniform motion range (FIG. 12).

When the vehicle acceleration is in the small acceleration range A (FIG. 14), the down-shaft correction factor DDSRDN is zero or almost zero. Thus, the target input shaft speed DSRREV is held almost unchanged so that the vehicle can coast down the hill without engine brake application. This is effective to provide a comfortable driving feel to the operator.

Figure 17:
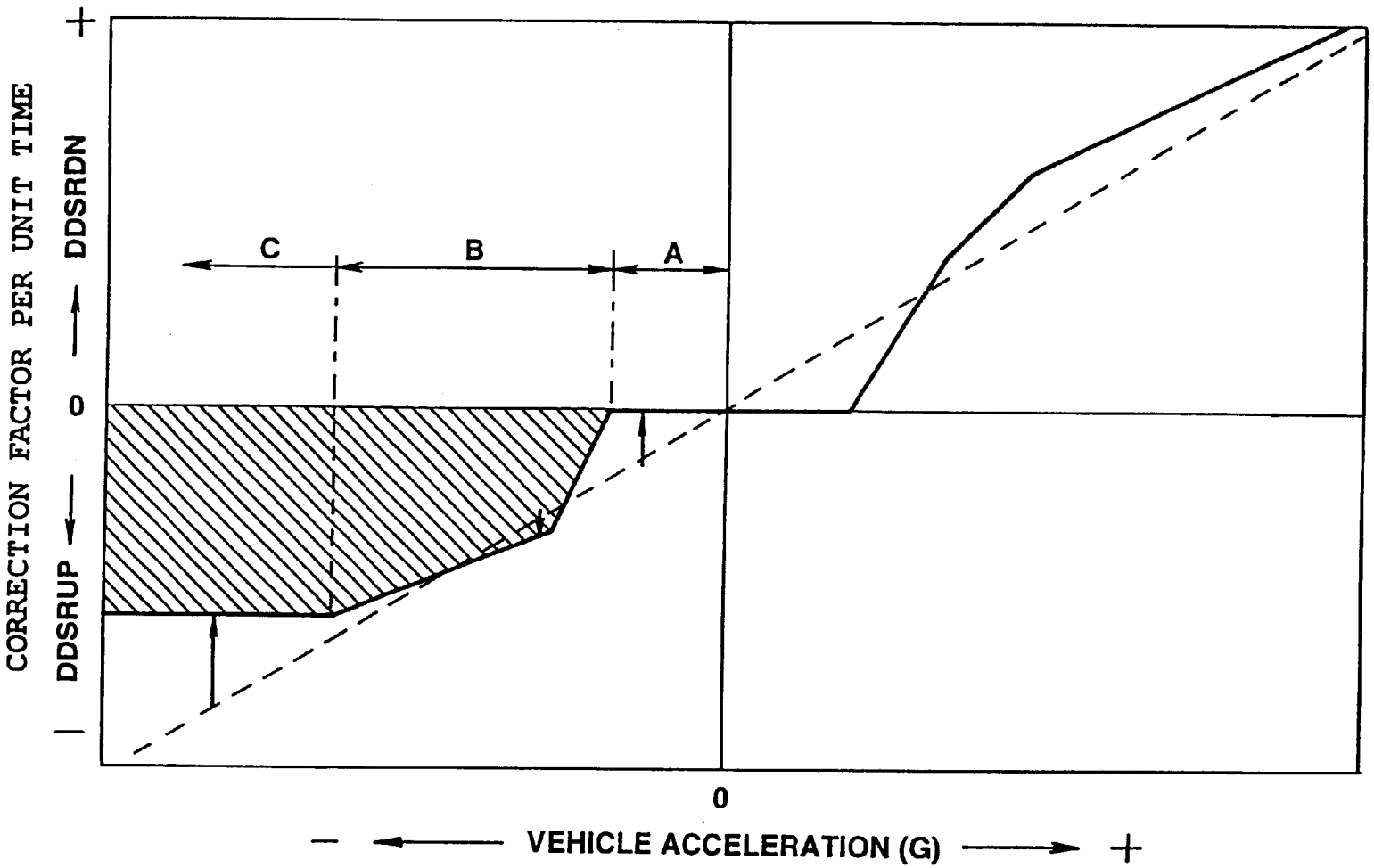
FIG. 17 is a graph of vehicle acceleration versus input shaft speed correction factor.

It has been discovered through experiments that the degree of deceleration the operator expects when the accelerator pedal is released remains about 0.06 G (acceleration=−0.0.6 G) and it is almost independent on the vehicle speed VSP, as shown in FIG. 17. If the deceleration is set at 0.06 G regardless of vehicle speed, however, the operator will bodily sense a stronger engine brake force at certain low vehicle speeds and an insufficient engine brake force at certain high vehicle speeds. For this reason, it is desirable to change the target deceleration according to the operators bodily sensation of the deceleration. That is, at certain low vehicle speeds, the target deceleration is reduced below 0.06 G. At certain high vehicle speeds, the rate of change of the deceleration is increased to change the engine brake force continuously to bring the vehicle acceleration into the uniform motion range (FIG. 12) with the accelerator pedal being depressed.

The calculation of the up-shift correction factor DDSRUP will be described further with reference to FIG. 17. The bold lines indicate changes in the up-shaft correction factor DDSRUP in connection with values set in direct proportion to the vehicle acceleration (deceleration), as indicated by the broken line. FIG. 17 shows the deceleration region where the vehicle acceleration is negative as divided into a small deceleration range A where the vehicle deceleration is less than a predetermined value near zero, an intermediate deceleration range B and a great deceleration range C. The small deceleration range A is characterized by the fact that the operator is bothered with frequent engine speed (target input shaft speed) changes, the operator feels a sense of incompatibility with the up-shift correction factor DDSRUP set in direct proportion to the vehicle acceleration, indicated by the broken line of FIG. 17, and the operator does not expect vehicle deceleration even when the accelerator pedal is released. Thus, it is desirable in the small acceleration range A to set the up-shift correction factor DDSRUP almost at zero. The vehicle acceleration (deceleration) comes into the intermediate deceleration range B, for example, when the vehicle is coasting on a road changing from a downhill slope to a steep uphill slope. The intermediate deceleration range B is characterized by the fact that the operator feels like the initiation of brake application and requires a rapid engine brake force decrease to retain the vehicle speed. The operator will be impatient with a delay of engine brake force decrease if the up-shift correction factor DDSRUP is set in direct proportion to the vehicle deceleration, as indicated by the broken line of FIG. 17. Thus, it is desirable in the intermediate deceleration range B to increase the rate of reduction of the engine brake force and thereafter decrease the engine brake force at a rate less than the gradient of the broken line of FIG. 17 by setting the absolute value of the up-shift correction factor DDSRUP at a great value according to the vehicle deceleration and then correct the up-shift correction factor DDSRUP at a rate smaller than the rate of change of the factor calculated in direct proportion the vehicle deceleration. In the great deceleration range C, the up-shift correction factor DDSRUP is set substantially at a constant value or at a value decreasing at a very small rate according to the vehicle deceleration. As shown in FIG. 17. the absolute value of the up-shift correction factor DDSRUP is less than the factor calculated in direct proportion to the vehicle deceleration, as indicated by the broken line of FIG. 17.

Figure 18:
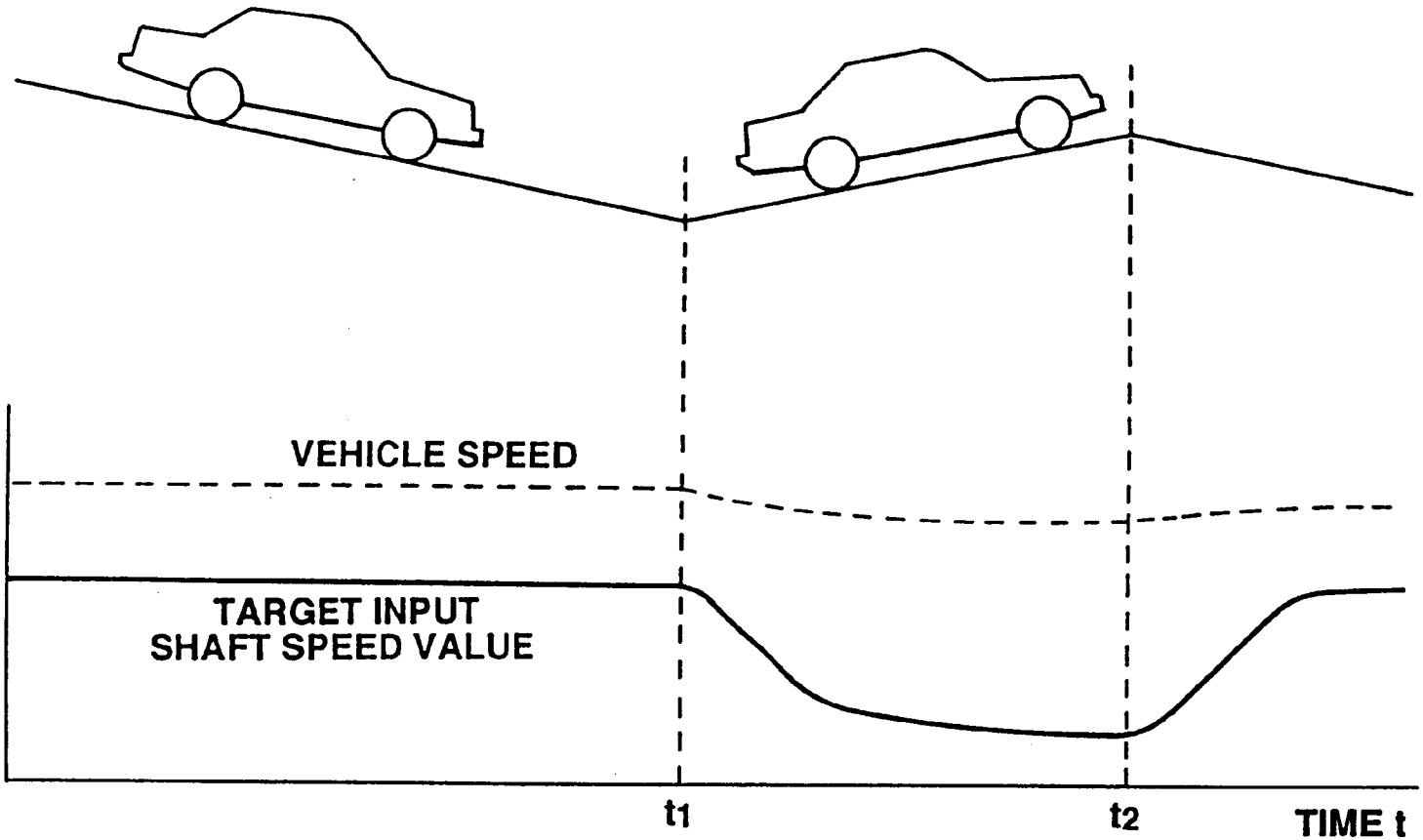
FIG. 18 is a graph used in explaining the operation of the speed change control apparatus of the invention when the vehicle is coasting on a road changing from a downhill slope to an uphill slope.

The operation of the speed change control apparatus of the invention will be described in connection with a vehicle coasting on a road changing from a downhill slope to an uphill slope, as shown in FIG. 18. In this case, a rapid engine brake force decrease is required to deal with a rapid vehicle deceleration increase at time t1. The invention meets this requirement by setting the deceleration flag VSPMS at the point 164 of FIG. 5 when the vehicle deceleration increases into the decelerated motion range (FIG. 12), calculating the up-shaft correction factor DDSRUP from the map, as shown in FIG. 13, at the point 172 of FIG. 6, and adding the correction factor DDSRUP to the corrected target input speed value DSRENBR at the point 216 of FIG. 7 since the accelerator pedal remains released and the brake pedal is released; As a result, the target input shaft speed DSRREV decreases by the correction factor DDSRUP at uniform intervals of time (5 msec). If the vehicle deceleration is in the intermediate or great deceleration range B or C (FIG. 17), the rate of decrease of the engine braking force will increase according to the degree of vehicle deceleration.

Since the target input shaft speed DSRREV changes continuously at uniform time intervals by an up-shaft correction factor DDSRUP set to decreases at a greater vehicle deceleration, as shown in FIGS. 13 and 17, when the vehicle deceleration exceeds a predetermined threshold value, the engine brake force can change, in such a smooth manner as to meet the operator's expectation, according to the vehicle deceleration change, as shown in FIG. 18, with no sudden change even upon the occurrence of a rapid and great vehicle deceleration change. It is, therefore, possible to permit the vehicle to coast smoothly on a road changing from a downhill slope to a steep uphill slope.

What is claimed is:

1. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:

means for sensing vehicle operating conditions including vehicle acceleration;

means for producing a released accelerator pedal indicative signal when the accelerator pedal is released;

means for calculating a target value for the speed of rotation of the input shaft based on the sensed vehicle operating conditions;

means for calculating a correction factor per predetermined unit time based on the sensed vehicle acceleration when the sensed vehicle acceleration exceeds a threshold value in the presence of the released accelerator pedal indicative signal;

means for adding the correction factor to the target input shaft speed value to correct the target input shaft speed value at intervals of the predetermined unit time; and means for controlling the speed ratio to bring the input shaft speed into coincidence with the corrected target value.

2. A continuously variable transmission control apparatus as claimed in claim 1, further including means for reducing the correction factor substantially to zero when the vehicle acceleration is equal to or less than a predetermined value.

3. A continuously variable transmission control apparatus as claimed in claim 1, further including means for increasing the correction factor based on the vehicle acceleration.

4. A continuously variable transmission control apparatus as claimed in claim 3, further including means for reducing the correction factor substantially to zero when the vehicle acceleration is equal to or less than a predetermined value.

5. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:

means for sensing vehicle operating conditions including vehicle deceleration;

means for producing a released accelerator pedal indicative signal when the accelerator pedal is released;

means for calculating a target value for the speed of rotation of the input shaft based on the sensed vehicle operating conditions;

means for calculating a correction factor per predetermined unit time based on the sensed vehicle deceleration when the sensed vehicle deceleration exceeds a first threshold value in the presence of the released accelerator pedal indicative signal;

means for subtracting the correction factor from the target input shaft speed value to decrease the target input shaft speed value at intervals of the predetermined unit time; and means for controlling the speed ratio to bring the input shaft speed into coincidence with the decreased target value.

6. A continuously variable transmission control apparatus as claimed in claim 5, further including means for reducing the correction factor substantially to zero when the vehicle deceleration is equal to or less than a predetermined value.

7. A continuously variable transmission control apparatus as claimed in claim 5, further including means for increasing the absolute value of the correction factor based on the vehicle deceleration.

8. A continuously variable transmission control apparatus as claimed in claim 7, further including means for reducing the correction factor substantially to zero when the vehicle deceleration is equal to or less than a predetermined value.

9. A continuously variable transmission control apparatus as claimed in claim 5, further including means for setting the correction factor at a constant value regardless of the vehicle deceleration when the vehicle deceleration exceeds a second threshold value having an absolute value greater than that of the first threshold value.

10. A method of controlling a continuously variable transmission for use with an automotive vehicle including an accelerator pedal, the transmission having an input and output shaft, the transmission being operable at a variable speed ratio for transmitting a drive from the input shaft to the output shaft, the method comprising the steps of:

sensing vehicle operating conditions including vehicle acceleration;

producing a released accelerator pedal indicative signal when the accelerator pedal is released;

calculating a target value for the speed of rotation of the input shaft based on the sensed vehicle operating conditions;

calculating a correction factor based on the sensed vehicle acceleration when the sensed vehicle acceleration exceeds a threshold value in the presence of the released accelerator pedal indicative signal;

adding the correction factor to the target input shaft speed value to correct the target input shaft speed value;

controlling the speed ratio to bring the input shaft speed into coincidence with the corrected target value; and continuously repeating the above sequence of steps at uniform intervals of time to effect changes in the target input shaft speed value in response to changes in the vehicle acceleration.

11. A method for controlling a continuously variable transmission in accordance with claim 10, wherein the step of calculating a correction factor includes the step of reducing the correction factor substantially to zero when the vehicle acceleration is equal to or less than a predetermined value.

12. A method for controlling a continuously variable transmission in accordance with claim 11, wherein the step of calculating a correction factor includes the step of increasing the correction factor based on the vehicle acceleration.

13. A method for controlling a continuously variable transmission in accordance with claim 10, wherein the step of calculating a correction factor includes the step of reducing the correction factor substantially to zero when the vehicle acceleration is equal to or less than a predetermined value.

14. A method of controlling a continuously variable transmission for use with an automotive vehicle including an accelerator pedal, the transmission having an input and output shaft, the transmission being operable at a variable speed ratio for transmitting a drive from the input shaft to the output shaft, the method comprising the steps of:

sensing vehicle operating conditions including vehicle deceleration;

producing a released accelerator pedal indicative signal when the accelerator pedal is released;

calculating a target value for the speed of rotation of the input shaft based on the sensed vehicle operating conditions;

calculating a correction factor based on the sensed vehicle deceleration when the sensed vehicle acceleration exceeds a first threshold value in the presence of the released accelerator pedal indicative signal;

subtracting the correction factor to the target input shaft speed value to decrease the target input shaft speed value;

controlling the speed ratio to bring the input shaft speed into coincidence with the decreased target value; and continuously repeating the above sequence of steps at uniform intervals of time to effect changes in the target input shaft speed value in response to changes in the vehicle deceleration.

15. A method for controlling a continuously variable transmission in accordance with claim 14, wherein the step of calculating a correction factor includes the step of reducing the correction factor substantially to zero when the vehicle deceleration is equal to or less than a predetermined value.

16. A method for controlling a continuously variable transmission in accordance with claim 15, wherein the step of calculating a correction factor includes the step of increasing the absolute value of the correction factor based on the vehicle deceleration.

17. A method for controlling a continuously variable transmission in accordance with claim 14, wherein the step of calculating a correction factor includes the step of reducing the correction factor substantially to zero when the vehicle deceleration is equal to or less than a predetermined value.

18. A method for controlling a continuously variable transmission in accordance with claim 14, wherein the step of calculating a correction factor includes the step of setting the correction factor at a constant value regardless of the vehicle deceleration when the vehicle deceleration exceeds a second threshold value having an absolute value greater than that of the first threshold value.

*19. An apparatus for controlling a continuously variable transmission for use with an automotive vehicle including an*

*accelerator pedal, the transmission having an input and output shaft, the transmission being operable at a variable speed ratio for transmitting a drive from the input shaft to the output shaft, comprising:*

*means for sensing vehicle operating conditions including vehicle speed;*

*means for calculating a target value for the speed of rotation of the input shaft based on the sensed vehicle operating conditions;*

*means for producing a released accelerator pedal indicative signal when the accelerator pedal is released;*

*means for determining a vehicle acceleration;*

*means for calculating a correction factor per predetermined unit time based on the determined vehicle acceleration when the determined vehicle acceleration exceeds a threshold value in the presence of the released accelerator pedal indicative signal;*

*means for adding the correcting factor to the target input shaft speed value to correct the target input shaft speed value at intervals of the predetermined unit time; and*

*means for controlling the speed ratio to bring the input shaft speed into coincidence with the corrected target value.*

*20. A continuously variable transmission control apparatus as claimed in claim 19, further including means for reducing the correction factor substantially to zero when the vehicle acceleration is equal to or less than a predetermined value.*

*21. A continuously variable transmission control apparatus as claimed in claim 19, further including means for increasing the corrector factor with the increase of the vehicle acceleration.*

*22. A continuously variable transmission control apparatus as claimed in claim 21, further including means for reducing the correction factor substantially to zero when the absolute value of the vehicle acceleration is equal to or less than a predetermined value.*

*23. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:*

*means for sensing vehicle operating conditions including vehicle speed;*

*means for calculating a target value for the speed of rotation of the input shaft based on the sensed vehicle operating conditions;*

*means for producing a released accelerator pedal indicative signal when the accelerator pedal is released;*

*means for determining a vehicle deceleration;*

*means for calculating a correction factor per predetermined unit time based on the determined vehicle deceleration when the determined vehicle deceleration exceeds a first threshold value in the presence of the released accelerator pedal indicative signal;*

*means for subtracting the correction factor from the target input shaft speed value to decrease the target input shaft speed value at intervals of the predetermined unit time; and*

*means for controlling the speed ratio to bring the input shaft speed into coincidence with the decreased target value.*

*24. A continuously variable transmission control apparatus as claimed in claim 23, further including means for reducing the correction factor substantially to zero when the vehicle deceleration is equal to or less than a predetermined value.*

*25. A continuously variable transmission control apparatus as claimed in claim 23, further including means for increasing the absolute value of the correction factor based on the vehicle deceleration.*

*26. A continuously variable transmission control apparatus as claimed in claim 25, further including means for reducing the correction factor substantially to zero when the vehicle deceleration is equal to or less than a predetermined value.*

*27. A continuously variable transmission control apparatus as claimed in claim 23, further including means for setting the correction factor at a constant value regardless of the vehicle deceleration when the vehicle deceleration exceeds a second threshold value having an absolute value greater than that of the first threshold value.*

*28. A method of controlling a continuously variable transmission for use with an automotive vehicle including an accelerator pedal, the transmission having an input and output shaft, the transmission being operable at a variable speed ratio for transmitting a drive from the input shaft to the output shaft, the method comprising the steps of:*

*sensing vehicle operating conditions including vehicle speed;*

*calculating a target value for the speed of rotation of the input shaft based on the sensed vehicle operating conditions;*

*producing a released accelerator pedal indicative signal when the accelerator pedal is released;*

*determining a vehicle acceleration;*

*calculating a correction factor based on the determined vehicle acceleration when the determined vehicle acceleration exceeds a threshold value in the presence of the released accelerator pedal indicative signal;*

*adding the correction factor to the target input shaft speed value to correct the target input shaft speed value;*

*controlling the speed ratio to bring the input shaft speed into coincidence with the corrected target value; and*

*continuously repeating the above sequence of steps at uniform intervals of time to effect changes in the target input shaft speed value in response to changed in the vehicle acceleration.*

*29. A method for controlling a continuously variable transmission in accordance with claim 28, wherein the step of calculating a correction factor includes the step of reducing the correction factor substantially to zero when the vehicle acceleration is equal to or less than a predetermined value.*

*30. A method for controlling a continuously variable transmission in accordance with claim 29, wherein the step of calculating a correction factor includes the step of increasing the correction factor based on the vehicle acceleration.*

*31. A method for controlling a continuously variable transmission in accordance with claim 28, wherein the step of calculating a correction factor includes the step of reducing the correction factor substantially to zero when the vehicle acceleration is equal to or less than a predetermined value.*

*32. A method of controlling a continuously variable transmission for use with an automotive vehicle including an accelerator pedal, the transmission having an input and output shaft, the transmission being operable at a variable speed ratio for transmitting a drive from the input shaft to the output shaft, the method comprising the steps of:*

*sensing vehicle operating conditions including vehicle speed;*

*calculating a target value for the speed of rotation of the input shaft based on the sensed vehicle operating conditions;*

*producing a released accelerator pedal indicative signal when the accelerator pedal is released;*

*determining a vehicle deceleration;*

*calculating a correction factor based on the determined vehicle deceleration when the determined vehicle deceleration exceeds a first threshold value in the presence of the released accelerator pedal indicative signal;*

*subtracting the correction factor to the target input shaft speed value to decrease the target input shaft speed value;*

*controlling the speed ratio to bring the input shaft speed into coincidence with the corrected target value; and*

*continuously repeating the above sequence of steps of uniform intervals of time to effect changes in the target input shaft speed value in response to changes in the vehicle deceleration.*

*33. A method for controlling a continuously variable transmission in accordance with claim 32, wherein the step of calculating a correction factor includes the step of reducing the correction factor substantially to zero when the vehicle deceleration is equal to or less than a predetermined value.*

*34. A method for controlling a continuously variable transmission in accordance with claim 33, wherein the step of calculating a correction factor includes the step of increasing the absolute value of the correction factor based on the vehicle deceleration.*

*35. A method for controlling a continuously variable transmission in accordance with claim 32, wherein the step of calculating a correction factor includes the step of reducing the correction factor substantially to zero when the vehicle deceleration is equal to or less than a predetermined value.*

*36. A method for controlling a continuously variable transmission in accordance with claim 32, wherein the step of calculating a correction factor includes the step of setting the correction factor at a constant value regardless of the vehicle deceleration when the vehicle deceleration exceeds a second threshold value having an absolute value greater than that of the first threshold value.*

* * * * *